United States Patent
Niida et al.

(10) Patent No.: US 7,161,619 B1
(45) Date of Patent: Jan. 9, 2007

(54) DATA COMMUNICATION SYSTEM, DATA COMMUNICATION CONTROL METHOD AND ELECTRONIC APPARATUS

(75) Inventors: Mitsuo Niida, Yokohama (JP); Shinji Ohnishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/361,413

(22) Filed: Jul. 27, 1999

(30) Foreign Application Priority Data

Jul. 28, 1998 (JP) .................................. 10-212758
Oct. 30, 1998 (JP) .................................. 10-311331

(51) Int. Cl.
  *H04N 5/225* (2006.01)
  *H04N 5/232* (2006.01)
  *G06K 9/00* (2006.01)

(52) U.S. Cl. ............................. 348/207.11; 348/211.8; 382/167

(58) Field of Classification Search ............. 348/14.03, 348/14.09, 14.12, 207.1, 207.11, 211.99, 348/211.3, 211.4, 211.1, 211.5, 211.7, 211.13, 348/231.9, 552, 207.2, 211.8, 230.1, 239; 382/167
See application file for complete search history.

(56) References Cited

U.S. PATENT DOCUMENTS

| | | | | |
|---|---|---|---|---|
| 5,479,206 A | * | 12/1995 | Ueno et al. ............... | 348/211.5 |
| 5,596,346 A | * | 1/1997 | Leone et al. ............... | 345/667 |
| 5,625,415 A | * | 4/1997 | Ueno et al. ............... | 348/350 |
| 5,990,973 A | * | 11/1999 | Sakamoto ............... | 348/246 |
| 6,005,613 A | * | 12/1999 | Endsley et al. .......... | 348/231.6 |
| 6,061,055 A | * | 5/2000 | Marks ............... | 382/276 |
| 6,100,812 A | * | 8/2000 | Tanaka et al. ........ | 340/825.37 |
| 6,122,005 A | * | 9/2000 | Sasaki et al. ............ | 348/211.3 |
| 6,313,875 B1 | * | 11/2001 | Suga et al. ............ | 348/211.99 |
| 6,323,906 B1 | * | 11/2001 | Kobayashi et al. ...... | 348/231.1 |
| 6,334,161 B1 | * | 12/2001 | Suzuki et al. ................. | 710/29 |
| 6,380,972 B1 | * | 4/2002 | Suga et al. ............ | 348/211.99 |
| 6,498,598 B1 | * | 12/2002 | Watanabe ............... | 345/156 |
| 6,522,354 B1 | * | 2/2003 | Kawamura et al. ...... | 348/231.2 |
| 6,535,245 B1 | * | 3/2003 | Yamamoto ............... | 348/223.1 |
| 6,545,708 B1 | * | 4/2003 | Tamayama et al. ...... | 348/211.8 |
| 6,670,991 B1 | * | 12/2003 | Takagi et al. ............... | 348/349 |
| 6,859,552 B1 | * | 2/2005 | Izume et al. ............... | 382/170 |
| 7,071,972 B1 | * | 7/2006 | Koyama ............... | 348/211.3 |
| 2001/0048447 A1 | * | 12/2001 | Jogo ........................ | 345/620 |

(Continued)

FOREIGN PATENT DOCUMENTS

JP           06242761 A      *    9/1994

(Continued)

*Primary Examiner*—John M. Villecco
(74) *Attorney, Agent, or Firm*—Fitzpatrick, Cella, Harper & Scinto

(57) ABSTRACT

A control apparatus is provided for controlling an image capture apparatus. The control apparatus includes a communication unit for receiving an image captured by the image capture apparatus, and a control unit coupled to the communication unit. The control unit controls a frame setting process for setting a shape, a position, and an area of a frame, and a first command sending process for sending a first command to the image capture apparatus in order to set the frame within the image captured by the image capture apparatus. The first command indicating the shape, the position, and the area set in the frame setting process. The control unit further controls a function selection process for selecting a function to be set in the frame, and a second command sending process for sending a second command to the image capture apparatus. The second command indicating the function selected in the function selection process.

18 Claims, 26 Drawing Sheets

U.S. PATENT DOCUMENTS

2004/0227826 A1* 11/2004 Wu et al. .................. 348/239
2005/0117025 A1* 6/2005 Ambiru et al. ........ 348/211.99
2005/0174590 A1* 8/2005 Kubo ........................ 358/1.9

FOREIGN PATENT DOCUMENTS

JP        08205021 A * 8/1996

* cited by examiner

FIG. 3A

CONTROL COMMAND

| AE MODE | AUTOMATIC EXPOSURE MODE |
|---|---|
| CC FILTER | COLOR CORRECTION FILTER |
| DIGITAL ZOOM | DIGITAL ZOOM |
| FADER | FADER |
| FOCAL LENGTH | FOCAL LENGTH CONTROL |
| FOCUS | MOVING CONTROL OF FOCUS LENS |
| FOCUSSING MODE | FOCUSSING MODE |
| FOCUSSING POSITION | FOCUSSING LENS POSITION CONTROL |
| FRAME | FRAME WITHIN IMAGE |
| GAIN | GAIN |
| GAMMA | GAMMA |
| IMAGE STABILIZER | VIBRATION CONTROL |
| INFRARED | INFRARED LIGHT PROCESS SWITCHING |
| IRIS | APERTURE |
| KNEE | KNEE POINT, KNEE SLOPE |
| ND FILTER | NEUTRAL DENSITY FILTER |
| OUTPUT SIGNAL MODE | OUTPUT DATA SIGNAL FORMAT |
| PAN/TILT/ROLL | TRIPOD HEAD CONTROL |
| SCAN MODE | CCD READING METHOD |
| SHIFT | SHIFT AMOUNT AND DIRECTION OF MANIPULATION |
| SHUTTER | SHUTTER SPEED |
| TILT | TILT AMOUNT AND DIRECTION OF MANIPULATION |
| VIDEO LIGHT/STROBE | VIDEO LIGHT, STROBE |
| WHITE BALANCE | WHITE BALANCE |
| ZOOM | ZOOMING |

FIG. 3B

STATUS COMMAND

| AE MODE | AUTOMATIC EXPOSURE MODE |
|---|---|
| CC FILTER | COLOR CORRECTION FILTER |
| DIGITAL ZOOM | DIGITAL ZOOM |
| FADER | FADER |
| FOCAL LENGTH | FOCAL LENGTH CONTROL |
| FOCUS | MOVING CONTROL OF FOCUS LENS |
| FOCUSSING MODE | FOCUSSING MODE |
| FOCUSSING POSITION | FOCUSSING LENS POSITION CONTROL |
| FRAME | FRAME WITHIN IMAGE |
| GAIN | GAIN |
| GAMMA | GAMMA |
| IMAGE STABILIZER | VIBRATION CONTROL |
| INFRARED | INFRARED LIGHT PROCESS SWITCHING |
| IRIS | APERTURE |
| KNEE | KNEE POINT, KNEE SLOPE |
| ND FILTER | NEUTRAL DENSITY FILTER |
| OUTPUT SIGNAL MODE | OUTPUT DATA SIGNAL FORMAT |
| PAN/TILT/ROLL | TRIPOD HEAD CONTROL |
| SCAN MODE | CCD READING METHOD |
| SHIFT | SHIFT AMOUNT AND DIRECTION OF MANIPULATION |
| SHUTTER | SHUTTER SPEED |
| TILT | TILT AMOUNT AND DIRECTION OF MANIPULATION |
| VIDEO LIGHT/STROBE | VIDEO LIGHT, STROBE |
| WHITE BALANCE | WHITE BALANCE |
| ZOOM | ZOOMING |
| DISTORTION | DISTORTION ABERRATION INFORMATION |
| FADER INFO | PRESET FADER INFORMATION |
| PEDESTAL | PEDESTAL |
| SHADING | PERIPHERAL SHADING |
| WHITE BALANCE INFO | PRESET WHITE BALANCE INFORMATION |

FIG. 3C

NOTIFY COMMAND

| CC FILTER | COLOR CORRECTION FILTER |
|---|---|
| DIGITAL ZOOM | DIGITAL ZOOM |
| FADER | FADER |
| FOCAL LENGTH | FOCAL LENGTH CONTROL |
| FOCUS | MOVING CONTROL OF FOCUSSING LENS |
| ND FILTER | NEUTRAL DENSITY FILTER |
| PAN/TILT/ROLL | TRIPOD HEAD CONTROL |
| SHIFT | SHIFT AMOUNT AND DIRECTION OF MANIPULATION |
| TILT | TILT AMOUNT AND DIRECTION OF MANIPULATION |
| VIDEO LIGHT/STROBE | VIDEO LIGHT, STROBE |
| ZOOM | ZOOMING |

FIG. 4

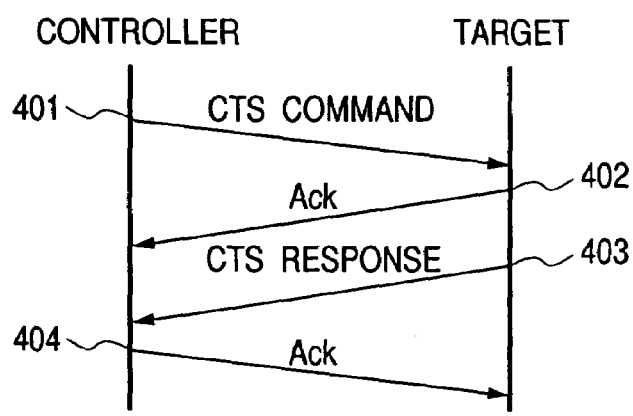

| VALUE | COMMAND TYPE | MEANING |
|---|---|---|
| 0 | CONTROL | CONTROL COMMAND |
| 1 | STATUS | DEVICE STATUS INQUIRY |
| 2 | INQUIRY | INQUIRY OF SUPPORT STATUS OF THE COMMAND |
| 3 | NOTIFY | DEVICE STATUS CHANGE NOTIFICATION |

FIG. 6

| opcode | Frame |
|---|---|
| operand [0] | Subfunction |
| operand [1] | Frame Number |
| operand [2] | Parameters |
| operand [3] | |
| ⋮ | |
| operand [n] | |

FIG. 7A

TRANSMITTED FIRST

| 0000 | response | Subunit_type | subunit ID | opcode | operand [0] |
|---|---|---|---|---|---|
| operand [1] | | operand [2] | | operand [3] | operand [4] |
| operand [n] | zero pad bytes (if necessary) | | | | |

TRANSMITTED LAST

FIG. 7B

| VALUE | RESPONSE TYPE | MEANING |
|---|---|---|
| 8 | NOT IMPLEMENTED | THE COMMAND IS NOT SUPPORTED |
| 9 | ACCEPTED | COMMAND WAS ACCEPTED |
| $A_{16}$ | REJECTED | COMMAND WAS REJECTED |
| $F_{16}$ | INTERIM | RETURN RESPONSE LATER |

| FUNCTION TYPE | PROCESS CONTENT |
|---|---|
| AUTO FOCUS | EXECUTE AUTOMATIC FOCUS |
| AUTO EXPOSURE | EXECUTE AUTOMATIC EXPOSURE |
| WHITE BALANCE | EXECUTE WHITE BALANCE SETTING |
| ZOOM | EXECUTE DIGITAL ZOOM |

FROM FIG. 25A

DATA COMMUNICATION SYSTEM, DATA COMMUNICATION CONTROL METHOD AND ELECTRONIC APPARATUS

BACKGROUND OF THE INVENTION

1. Field of the Invention

The present invention relates to a data communication system, a data communication control method and an electronic apparatus, particularly to a network in which digitized image signals are dealt with.

2. Related Background Art

Recently, techniques for transmitting digitized animated image signals in real time have been developed. As one of the techniques, there is a high-rate serial bus (hereinafter referred to as 1394 serial bus) in conformity with IEEE (the Institute of Electrical and Electronics Engineers, Inc.) 1394-1995 standards (hereinafter referred to as IEEE 1394 standards). The technique is noted as a communication interface of a camera incorporating type digital video recorder (hereinafter referred to as DVCR) or another AV (Audio/Visual) apparatus.

In the IEEE 1394 standards, however, physical, electrical constitution of a connector, two types of most basic data transfer systems, and the like are merely defined, and it is not defined what type of apparatus is used and how the apparatus is constructed to be remote-controlled. Moreover, a type of data to be transmitted, a data format and a communication procedure for the transmittance are also indefinite.

Therefore, in the 1394 serial bus, a camera unit equipped in DVCR cannot be remote-operated, so that a user must directly operate a DVCR unit.

Furthermore, in the 1394 serial bus, a high-rate image transfer can be performed, but the setting of an image quality for a displayed image of a certain apparatus, or the setting of an image quality for a taken image of a certain apparatus cannot be remote-operated.

On the other hand, in the conventional DVCR, auto-focusing or another specific function is only preset for a fixed area on the taken image. Therefore, the user himself cannot set an arbitrary area for the taken image, or cannot select or set a desired function for the area. Furthermore, such operation cannot be performed in a remote manner.

SUMMARY OF THE INVENTION

An object of the present invention is to solve the above-described problems.

Another object of the invention is to provide an operation environment to realize various controls and inquiries concerning a taken image of an image pickup unit and a displayed image of a display unit by remote operation in a data communication system, data communication control method and electronic apparatus.

In an embodiment of the present invention, a method for controlling an image capture appartus is provided. The method includes the steps of receiving an image captured by the image capture apparatus; setting a shape, a position, and an area of a frame; sending a first command to the image capture apparatus in order to set the frame within the image captured by the image capture apparatus, the first command indicating the shape, the position, and the area set in the frame setting step; selecting a function to be set in the frame; and sending a second command to the image capture apparatus, the second command indicating the function selected in the function selection step.

In another embodiment of the present invention, a control apparatus for controlling an image capture appratus is provided. The control apparatus includes a communication unit for receiving an image captured by the image capture apparatus, and a control unit coupled to the communication unit. The control unit controls a frame setting process for setting a shape, a position, and an area of a frame, and a first command sending process for sending a first command to the image capture apparatus in order to set the frame within the image captured by the image capture apparatus. The first command indicating the shape, the position, and the area set in the frame setting process. The control unit further controls a function selection process for selecting a function to be set in the frame, and a second command sending process for sending a second command to the image capture apparatus. The second command indicating the function selected in the function selection process.

In a further embodiment of the present invention, a storage medium which stores software for executing a method for controlling an image capture apparatus is provided. The method includes the steps of receiving an image captured by the image capture apparatus; setting a shape, a position, and an area of a frame; sending a first command to the image capture apparatus in order to set the frame within the image captured by the image capture apparatus, the first command indicating the shape, the position, and the area set in the frame setting step; selecting a function to be set in the frame; and sending a second command to the image capture apparatus, the second command indicating the function selected in the function selection step.

Still other objects of the present invention, and the advantages thereof, will become fully apparent from the following detailed description of the embodiments.

BRIEF DESCRIPTION OF THE DRAWINGS

FIGS. 3A, 3B and 3C are views showing types of commands (control command, status command, notify command).

FIG. 4 is an explanatory view of a communication procedure based on FCP.

FIG. 6 is a view showing the data format of FRAME COMMAND of the first embodiment.

FIGS. 7A and 7B are views showing data formats of CTS responses of the first embodiment.

DETAILED DESCRIPTION OF THE PREFERRED EMBODIMENTS

The preferred embodiments of the present invention will now be described in detail hereinafter with reference to the accompanying drawings.

First Embodiment

In a first embodiment, an operation environment will be described in which a network for realizing a real-time data communication of IEEE 1394 serial bus or the like is connected to a target having a camera unit and a controller for remote-operating the target, and a taken image of the camera unit is remote-operated while a controller display screen is being observed.

Figure 1:
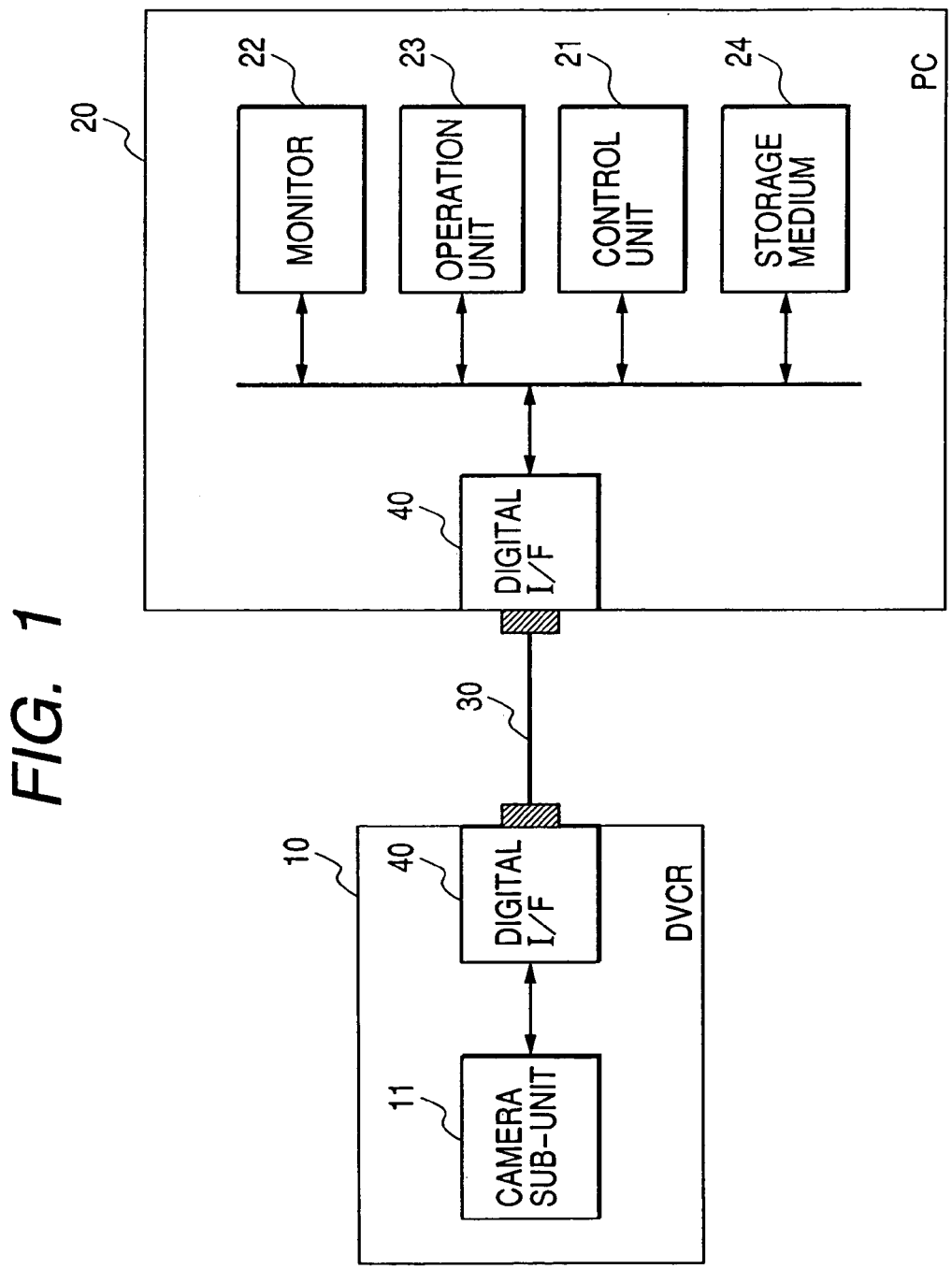
FIG. 1 is a block diagram showing a constitution of a data communication system of a first embodiment.

FIG. 1 is a block diagram showing a constitution of a data communication system of the first embodiment.

In FIG. 1, a camera incorporating type digital video recorder (hereinafter referred to as DVCR) 10 is a target of the present embodiment, and a personal computer (hereinafter referred to as PC) 20 is a controller of the embodiment. Numeral 30 denotes a communication cable in conformity with IEEE 1394 standards. Here, each of DVCR 10 and PC 20 is provided with a digital interface (hereinafter referred to as 1394 interface) 40 in conformity with IEEE 1394 standards. When apparatuses are interconnected using the communication cable 30, a bus type network is constituted to realize a high-rate serial data communication.

The DVCR 10 of FIG. 1 is provided with a camera sub-unit 11 for generating an image signal of a predetermined format from an optical image of a subject. An animated image taken by the camera sub-unit 11 of DVCR 10 is transferred in real time using Isochronous transfer system based on IEEE 1394 standards. Moreover, a control command asynchronously transferred between DVCR 10 and PC 20 is transferred using Asynchronous transfer system based on IEEE 1394 standards.

Figure 31:
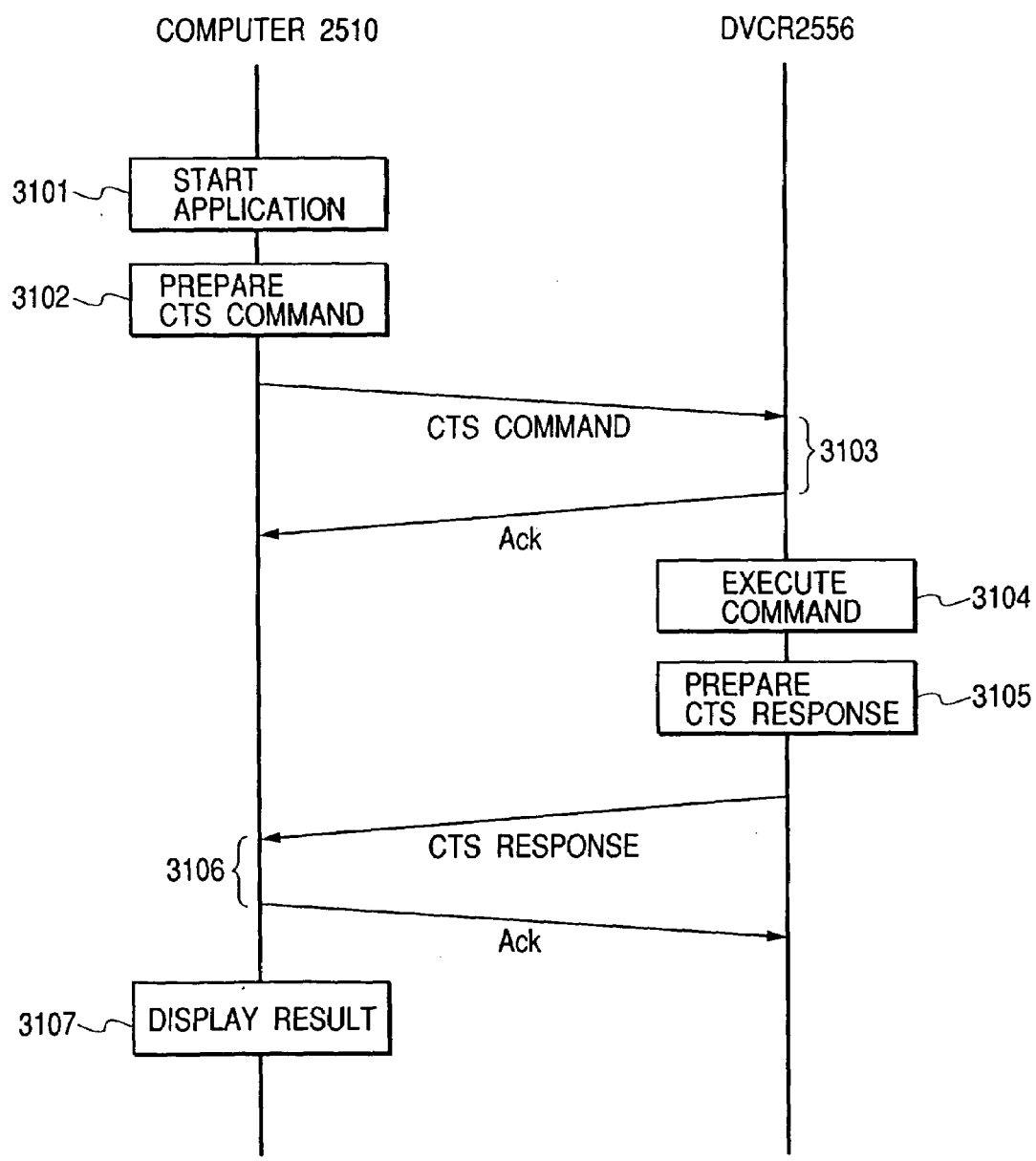
FIG. 31 is a view showing a procedure for remote-controlling a taken image.
Figure 32:
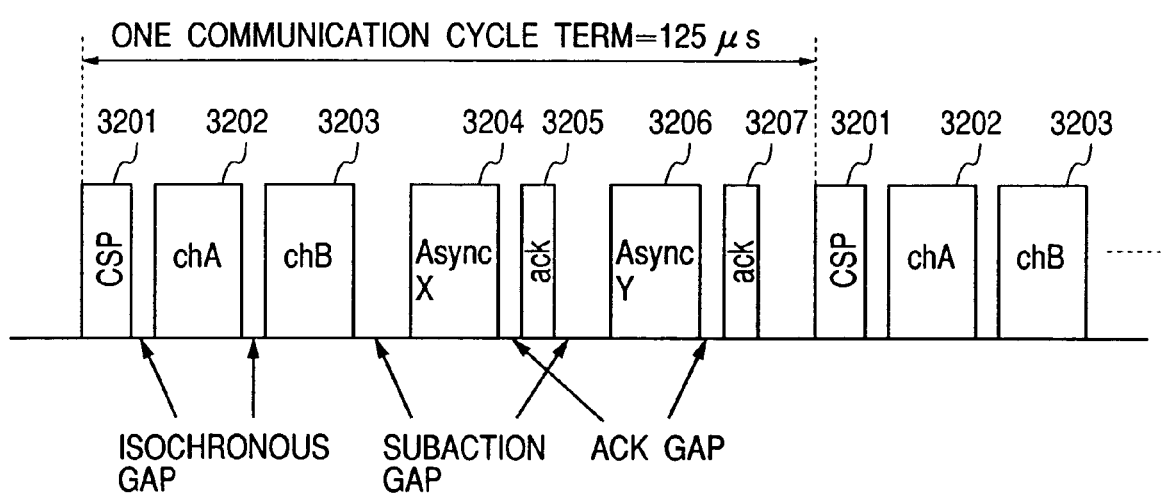
FIG. 32 is a view showing a communication method for transferring moving image data and a communication method for transferring CTS command, in the embodiment.

Here, Isochronous transfer system is a communication system which assures the transfer of a constant amount of data for each predetermined communication cycle (one communication cycle is nearly 125 µs) and which is suitable for a real-time communication of animated images, voice and the like as shown in 3202 and 3203 of FIG. 32. Also, Isochronous transfer system is a broadcast communication which does not specify communication destinations. Each device manages Isochronous data outputted by using channel number (chA, chB shown in FIG. 32) assigned to the device and a communication band. Moreover, Asynchronous transfer system is a communication system which becomes effective when the control command, file data and the like are asynchronously transferred as required as shown in 3204 and 3206 of FIG. 32. Further, there are a one-on-one communication specifying the communication destination and the broadcast communication not specifying the communication destination in Asynchronous transfer system. Though a receiving node returns acknowledgment (ack 3105, 3107 in FIG. 31) in the one-on-one communication, the receiving node does not return the acknowledgment in the broadcast communication. CTS command and CTS response described later use the one-on-one command. Here, Isochronous transfer system and Asynchronous transfer system can be mixed in a time division manner, and in one communication cycle period, Isochronous transfer system has a higher priority than Asynchronous transfer system because an idle term (Isochronous gap in FIG. 31) in which the Isochronous transfer system is executed is set shorter than an idle term (Subaction gap in FIG. 31) in which the Asynchronous transfer system is executed. Accordingly, the Isochronous transfer system is executed subsequent to CSP (Cycle Start Packet) 3101 transferred initially in each communication cycle, prior to the Asynchronous transfer system. By the function, animated images, voices and other information signals having real-time properties can be transmitted without being interrupted in the data communication system of the embodiment.

As described above, in the embodiment, since the devices are interconnected via the 1394 interface, communication data of each device can be communicated serially and bidirectionally. Therefore, as compared with the conventional parallel communication, the cost of the entire system can be reduced, and a higher-rate communication can be realized.

In the PC 20 of FIG. 1, numeral 21 denotes a control unit, 22 denotes a monitor, 23 denotes an operation unit constituted of a mouse, keyboard and the like, and 24 denotes a hard disc or another storage medium. In the storage medium 24, an application for controlling the camera sub-unit 11 the target has is stored as a program code. The control unit 21 reads the program code from the storage medium 24, and starts the application to control a display screen of the monitor 22 and the communication with DVCR 10 in accordance with the operation of the operation unit 23.

Figure 2:
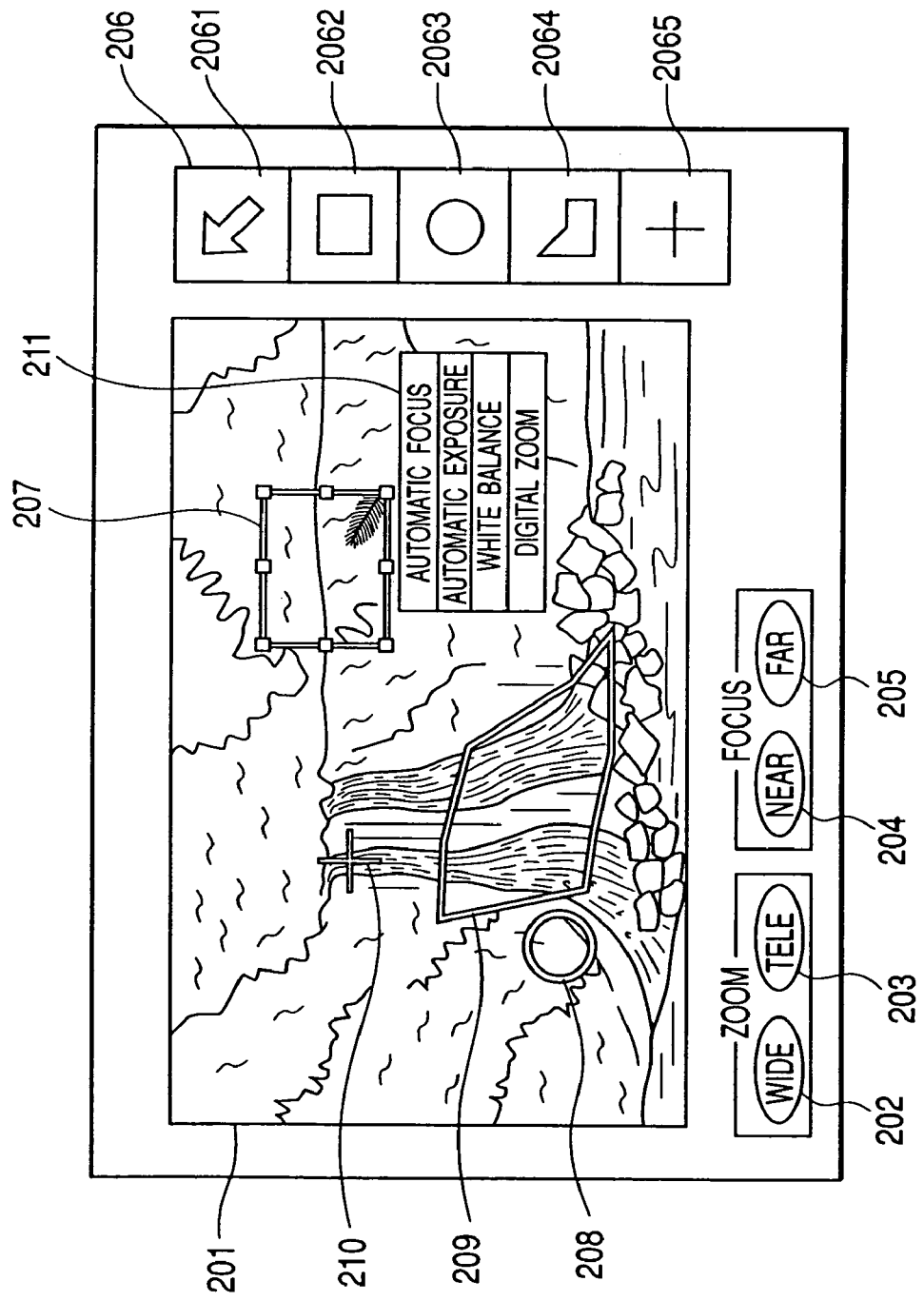
FIG. 2 is a view showing one example of a graphical user interface of the first embodiment.

FIG. 2 is a view showing one example of the display screen of the monitor 22 provided in the PC 20. Additionally, the display screen of the monitor 22 is prepared based on the application processed by the control unit 21.

In FIG. 2, numeral 201 denotes a preview screen on which a taken image isochronously transferred from the DVCR 10 is displayed in an animated manner.

Moreover, in FIG. 2, numeral 202 denotes Wide button for moving a digital zoom of DVCR 10 in a wide direction, 203 denotes Tele button for moving the digital zoom of DVCR 10 in a tele-direction, 204 denotes Near button for moving a focus of DVCR 10 in a near direction, 205 denotes Far button for moving the focus of DVCR 10 in a far direction, and 206 denotes a control button for setting an area (hereinafter referred to as the frame) having various shapes on the taken image of the DVCR 10. The buttons 202 to 206 are indicated with icons on the screen.

Furthermore, in FIG. 2, numeral 2061 denotes a control button for selecting a desired frame from frames which have been set, 2062 denotes a control button for setting a frame having a rectangular shape (hereinafter referred to as the rectangular frame) on the screen of the taken image, 2063 denotes a control button for setting a frame having a circular shape (hereinafter referred to as the circular frame), 2064 denotes a control button for setting a frame having a polygonal shape (hereinafter referred to as the polygonal frame), and 2065 denotes a control button for setting a pixel unit frame (hereinafter referred to as the pixel frame).

Additionally, in FIG. 2, numerals 207 to 210 are frames which are set on the taken image screen using the control button 206, and 211 denotes a menu window for performing the setting, or inquiring of various functions for the selected frame.

In FIG. 2, when the buttons 202 to 205 are operated by the user, the PC 20 asynchronously transfers to the DVCR 10 a control command corresponding to an operation result. The camera sub-unit 11 of DVCR 10 controls its operation in accordance with a content of the received control command. FIG. 3A shows one example of a control command for controlling the camera sub-unit 11.

For example, when the buttons 202, 203 are operated, PC 20 asynchronously transfers to the DVCR 10 a control command "ZOOM" to control a digital zoom of the camera sub-unit 11. The DVCR 10 operates the digital zoom of the camera sub-unit 11 in the wide direction or the tele-direction in accordance with the content of the control command.

Moreover, in order to know a state of the camera sub-unit 11 of DVCR 10, PC 20 can asynchronously transfer a status command shown in FIG. 3B. The PC 20 can know the current state of the camera sub-unit 11 by a response to the status command.

For example, when the PC 20 asynchronously transfers the status command "ZOOM" to the DVCR 10, the DVCR 10 responds to the PC 20 by transmitting position information of the digital zoom of the camera sub-unit 11.

Furthermore, the PC 20 can asynchronously transfer a notify command shown in FIG. 3C to the DVCR 10. When a change occurs in the state designated by the notify command, the camera sub-unit 11 having received the notify command returns the state change to the PC 20.

For example, the PC 20 asynchronously transfers to the DVCR 10 a notify command "ZOOM" to designate a position of digital zoom of the camera sub-unit 11. In this case, when the digital zoom of the camera sub-unit 11 reaches the position, the DVCR 10 returns a response.

In the embodiment, various commands (control command, status command, notify command) shown in FIG. 3 are transmitted by FCP (Function Control Protocol). FIG. 4 is an explanatory view of a communication procedure of FCP. In the embodiment, a series of communication procedure shown in FIG. 4 is hereinafter referred to as a command transaction, and a combination of a command transmitted based on the command transaction and a response to the command is referred to as CTS (Command Transaction Set) command and CTS response.

In FIG. 4, first, the PC 20 (controller) uses Asynchronous Write transaction based on IEEE 1394 standards to write CTS command 401 into a predetermined memory space (command register) provided in the DVCR 10 (target). The target returns an acknowledgment 402 for the Asynchronous transfer to the controller.

Subsequently, the target executes a processing corresponding to the CTS command 401, and additionally prepares CTS response 403 from an execution result. Thereafter, the target uses Asynchronous Write transaction to write the CTS response 403 into a predetermined memory space (response register) provided in the controller. The controller returns an acknowledgment 404 for the Asynchronous transfer to the target.

A packet format of Asynchronous packet for transmitting the CTS command and CTS response of the embodiment will next be described with reference to FIG. 26. The packet is transferred to another node by "write transaction" as one of services provided by Asynchronous transfer. The "write transaction" is a service for designating a predetermined area on CSR (Control and Status Register) space of a certain node to write desired data into the area. Here, the CSR space is an address space of 64 bits in conformity with IEEE 1212 standards. Upper 16 bits of the CSR space are used in designation of bus and node (bus ID and node ID), while lower 48 bits are used as an address space of each node.

Figure 26:
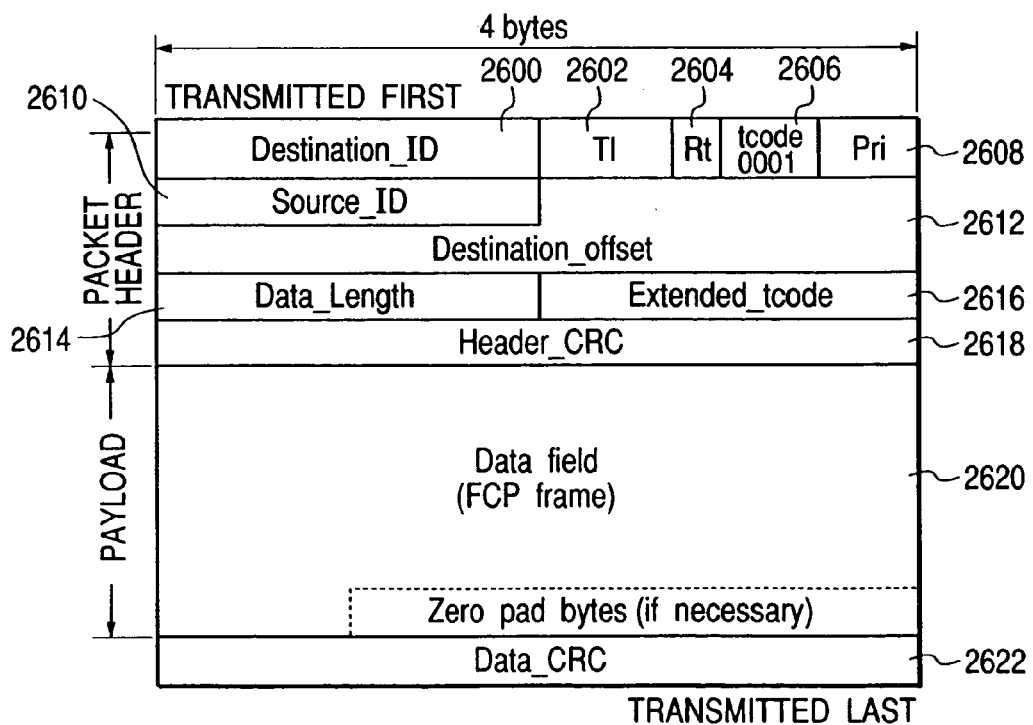
FIG. 26 is a view showing a packet format of Asynchronous packet.

In FIG. 26, numeral 2600 denotes Destination_ID field, 2602 denotes a transaction label (hereinafter referred to as tl) field, 2604 denotes a retry code (hereinafter referred to as Rt) field, and 2606 denotes a transaction code (hereinafter referred to as tcode) field.

Numeral 2608 denotes a priority (hereinafter referred to as Pri) field, 2610 denotes a source ID (hereinafter referred to as Source_ID) field, 2612 denotes Destination_offset field, 2614 denotes Data_length field, 2616 denotes an extended transaction code (hereinafter referred to as Extended_tcode) field, 2618 denotes a header CRC (hereinafter referred to as Header_CRC) field, 2620 denotes a data field, and 2622 denotes a data CRC (hereinafter referred to as Data_CRC) field.

The Asynchronous packet of FIG. 26 is a data packet having a unit of four bytes (32 bits, hereinafter referred to as quadred). The Destination_ID field 2600 (16 bits) indicates a node ID to designate a destination on the same bus. In the next 6-bit field, the transaction label (tl) field 2602 (6 bits) indicates a tag peculiar to each transaction. In the next 2-bit field, the retry (Rt) code 2604 (2 bits) designates whether the packet makes a retry.

The transaction code (tcode) 2606 (4 bits) designates a packet format, and a transaction type to be executed. In the embodiment, for example, the value is "$0001_2$", requesting for a writing transaction of a data block. The priority (Pri) field 2608 (4 bits) designates a priority. In the embodiment, since the asynchronously transferred packet is used, the value of the field is "$0000_2$".

The Source_ID field 2610 (16 bits) indicates a node ID to designate a transmission end on the same bus. The Destination_offset field 2612 (48 bits) designates lower 48 bits on the CSR space of the destination node.

The Data_length field 2614 (16 bits) indicates a length of a data field described later in the unit of byte. In the embodiment the Extended_tcode field 2616 (16 bits) is "$0000_{16}$".

The above-described Destination_ID field 2600 to the Extended_tcode field 2616 are referred to as a packet header. The Header_CRC field 2618 (32 bits) is used in error detection of the packet header.

In the data field 2620 (variable length), CTS command frame and CTS response frame described later are set. The data field 2620 is referred to as the payload. When the data field 2620 is less than a multiple of quadred, "0" is filled.

The Data_CRC field 2622 (32 bits) is used in the error detection of the data field 2620 in the same manner as the Header_CRC field 2618.

Data formats of CTS command transferred to the target from the controller and CTS response transferred to the controller from the target will be described in detail hereinafter with reference to FIGS. 5 to 7.

Figures 5A, 5B:
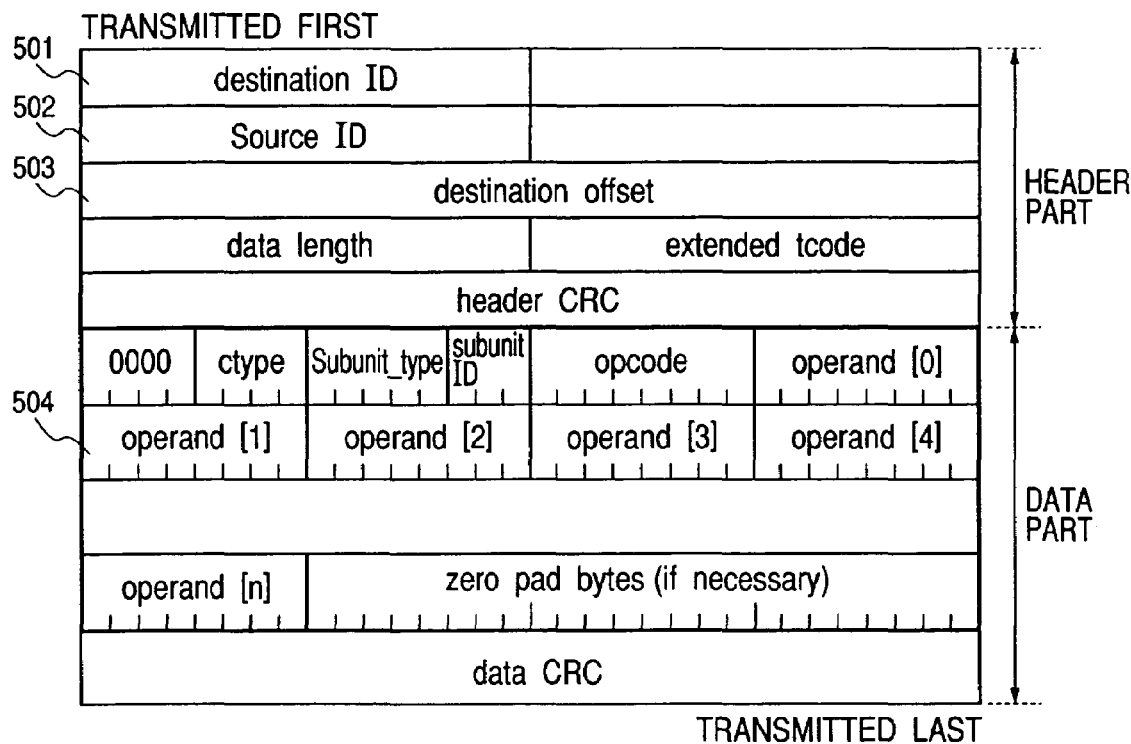
FIGS. 5A and 5B are views showing data formats of CTS commands of the first embodiment.

FIG. 5A is a view showing the data format of CTS command asynchronously transferred to the target from the controller.

In FIG. 5A, numeral 504 denotes CTS command. In a ctype field of the CTS command 504, codes for designating command types are stored. FIG. 5B shows examples of the command types stored in the ctype field.

Moreover, in the CTS command 504, data specifying to which sub-unit provided in the target the command corresponds are stored in Subunit_type field and Subunit ID field. In an opcode field and operand [0] to operand [n] fields, data designating a content of an actual command are stored.

FIG. 6 is a view showing one example of the data which are stored in the opcode field and the operand [0] to operand [n] fields. In FIG. 6, the setting of a frame for the taken image of the target, or CTS commands for setting various functions concerning the frame will be described.

In FIG. 6, a code indicating that the command is a command "FRAME" concerning frame control is stored in the opcode field. In the operand [0] field, a code indicating a processing performed by the command is stored. In the operand [1] field, a frame number indicating a frame as an object of the command is stored. In the operand [2] to operand [n] fields, various parameters for use in the command (e.g., position information of each coordinate to designate a frame range) are stored.

FIG. 7A is a view showing a data format of CTS response asynchronously transferred to the controller from the target.

In FIG. 7A, a code designating a response type is stored in a response field. FIG. 7B shows examples of response types stored in the response field.

Moreover, in FIG. 7A, data specifying from which sub-unit provided in the target the response is transferred are stored in Subunit_type field and Subunit ID field. In the opcode field and the operand [0] to operand [n] fields, data designating a content of an actual response are stored.

A procedure will be described hereinafter in which the controller uses the CTS commands shown in FIG. 5 and the CTS responses shown in FIG. 7 to set the frame for the taken image of the target, set various functions for the inquiry or the frame and to remote-operate the inquiry.

(1) Inquiry of the Number of Frames

Figure 8:
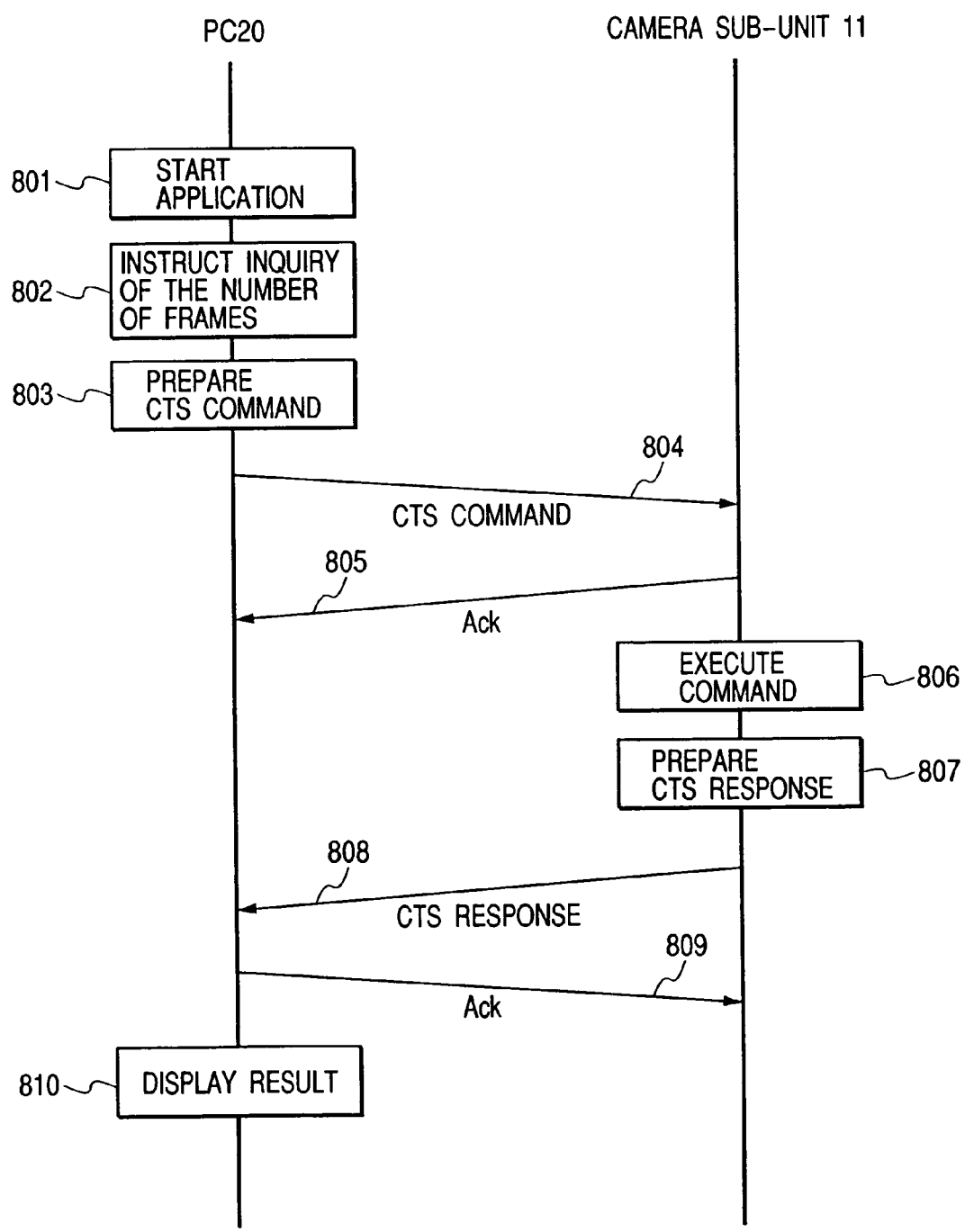
FIG. 8 is a view showing a procedure for inquiring the number of frames.

In the embodiment, the application of PC 20 can inquire of the camera sub-unit 11 about the number of frames which can be set in the taken image of the camera sub-unit 11. A procedure for inquiring the number of frames will be described hereinafter with reference to FIG. 8.

In the PC 20, the user starts the application to display a screen on the monitor 22 as shown in FIG. 2 (801).

After the application is started, the user uses the operation unit 23 to operate the menu window 211, and instructs the inquiry of the number of frames which can be set (802).

After the user's instruction input is confirmed, the PC 20 prepares CTS command to inquire the number of frames (803). In this case, the CTS command prepared by the PC 20 is shown in FIG. 9.

Figure 9:
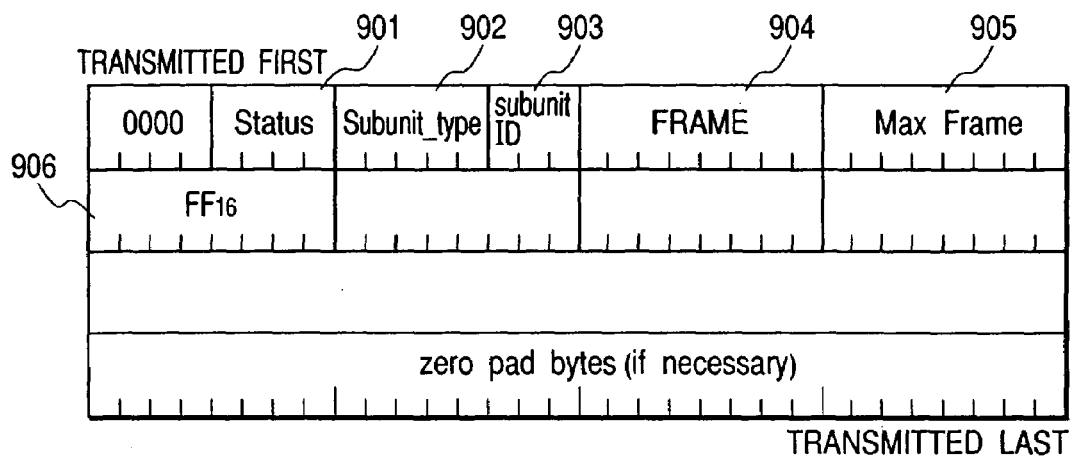
FIG. 9 is a view showing CTS command for inquiring the number of frames.

In FIG. 9, in a ctype field 901 is set "Status" which indicates that the command is a status command to inquire the state of the camera sub-unit 11. Data specifying the camera sub-unit 11 of DVCR 10 are stored in Subunit_type field 902 and Subunit ID field 903.

Moreover, in FIG. 9, a code indicating a command "FRAME" concerning the frame control is set in an opcode field 904. In an operand [0] field 905 is set a command "Max Frame" to inquire the maximum number of frames which can be set in the camera sub-unit 11. Dummy data is set in an operand [1] field 906.

After the CTS command of FIG. 9 is prepared, the PC 20 sets the CTS command in Asynchronous packet shown in FIG. 26, and transfers the packet to the camera sub-unit 11 (804).

After receiving the above-described CTS command, the camera sub-unit 11 returns an acknowledgment to the PC 20 (805).

Moreover, the camera sub-unit 11 executes a processing corresponding to the received CTS command (806), and additionally prepares CTS response corresponding to the CTS command (807). In this case, the CTS response prepared by the camera sub-unit 11 is shown in FIG. 10.

Figure 10:
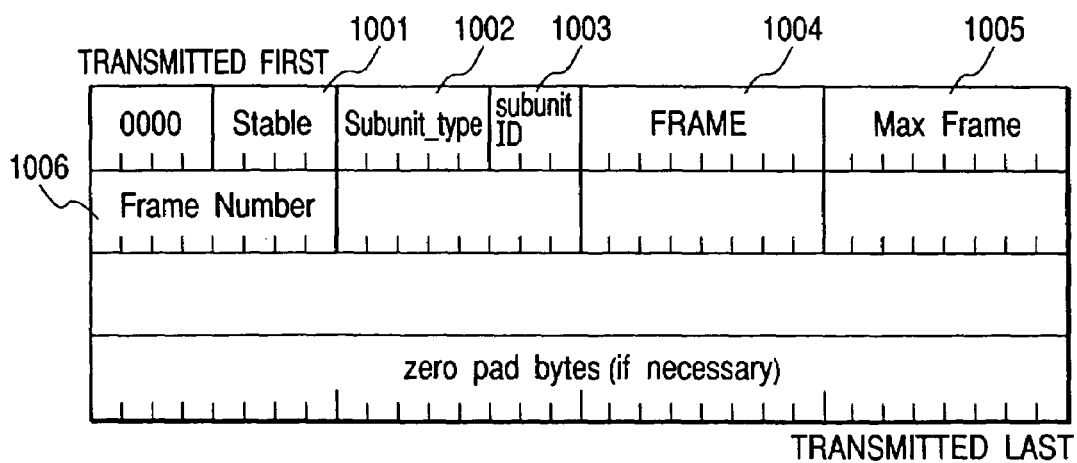
FIG. 10 is a view showing CTS response for the inquiry of the number of frames.

In FIG. 10, "Stable" is set in a response field 1001. Data specifying the camera sub-unit 11 of DVCR 10 are stored in Subunit_type field 1002 and Subunit ID field 1003.

Moreover, in FIG. 10, the same codes "FRAME" and "Max Frame" as the CTS commands transferred from the PC 20 are set in an opcode field 1004 and operand [0] field 1005. The maximum number of frames which can be set in the camera sub-unit 11 is set in an operand [1] field 1006.

After the CTS responses of FIG. 10 are prepared, the camera sub-unit 11 sets the CTS responses in Asynchronous packet shown in FIG. 26, and transfers the packet to the PC 20 (808).

After receiving the above-described CTS response, the PC 20 returns an acknowledgment to the camera sub-unit 11 (809). Thereafter, the PC 20 visually displays the maximum number of frames included in the CTS response on the monitor 22 (810).

By the above-described procedure, the PC 20 can confirm the maximum number of frames which can set in the taken image of the camera sub-unit 11, and can additionally control the number of frames which can be set in the camera sub-unit 11 by the application of PC 20.

(2) Setting of Frame

Figure 11:
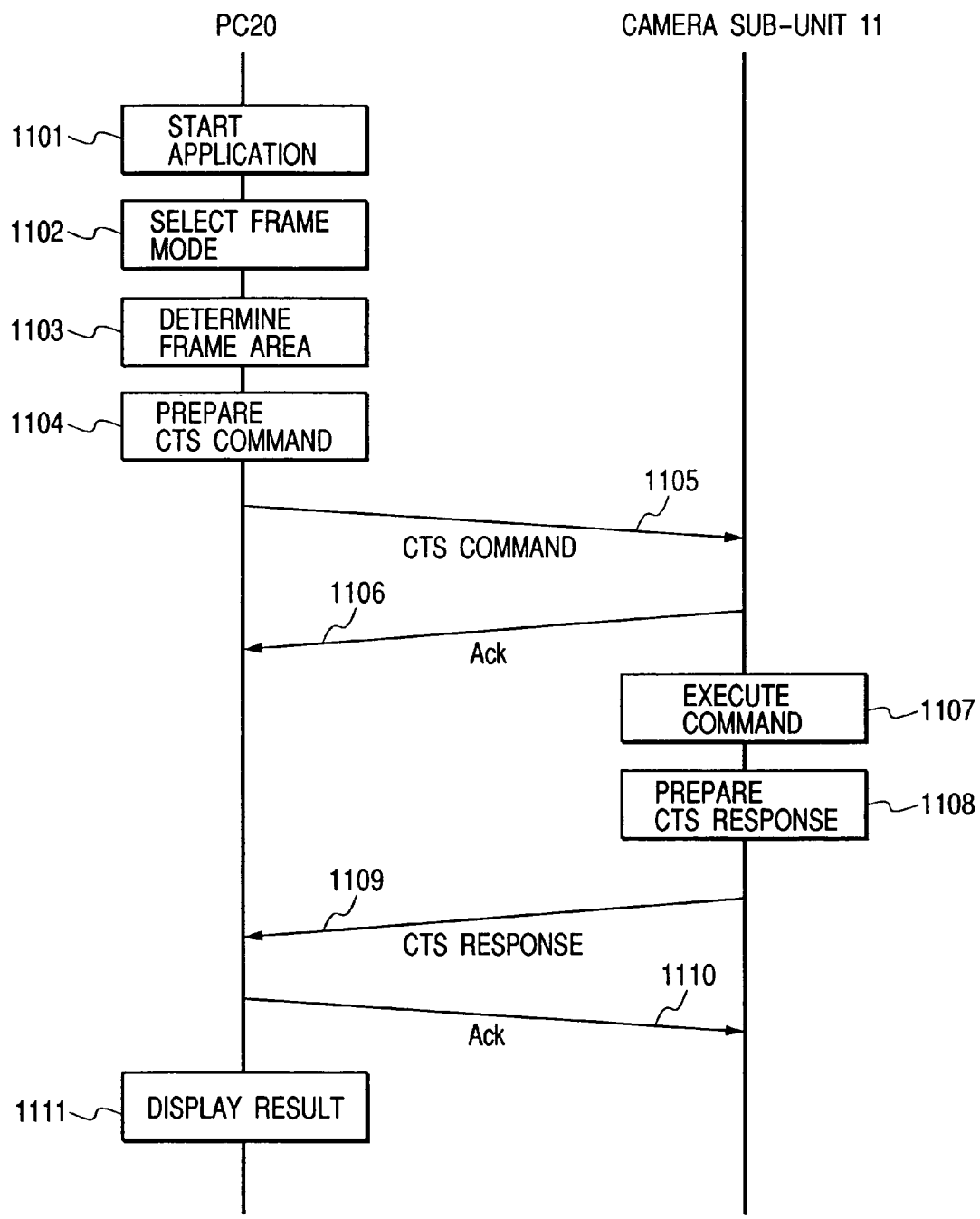
FIG. 11 is a view showing a procedure for setting various frames.

In the embodiment, the application of the PC 20 can set a plurality of types of frames in the taken image of the camera sub-unit 11. A procedure for setting various frames will be described hereinafter with reference to FIG. 11.

(2-1) Setting of Rectangular Frame

In the PC 20, the user starts the application to display a screen on the monitor 22 as shown in FIG. 2 (1101).

After the application is started, the user uses the operation unit 23 to operate the control button 2062, and selects a rectangular frame setting mode from a plurality of modes (1102).

In the rectangular frame setting mode, the user operates the operation unit 23, and sets a start point of the rectangular frame for the taken image on the preview screen 201. Subsequently, the user operates the operation unit 23 to set an end point of the rectangular frame. Thereby, a rectangular area with the start and end points being diagonal is determined as in the frame 207 of FIG. 2 (1103).

After the rectangular frame is set by the application, the PC 20 prepares CTS command to set the rectangular frame (1104), and asynchronously transfers the CTS command to the camera sub-unit 11 (1105). In this case, the CTS command prepared in the PC 20 will be described with reference to FIG. 12.

Figure 12:
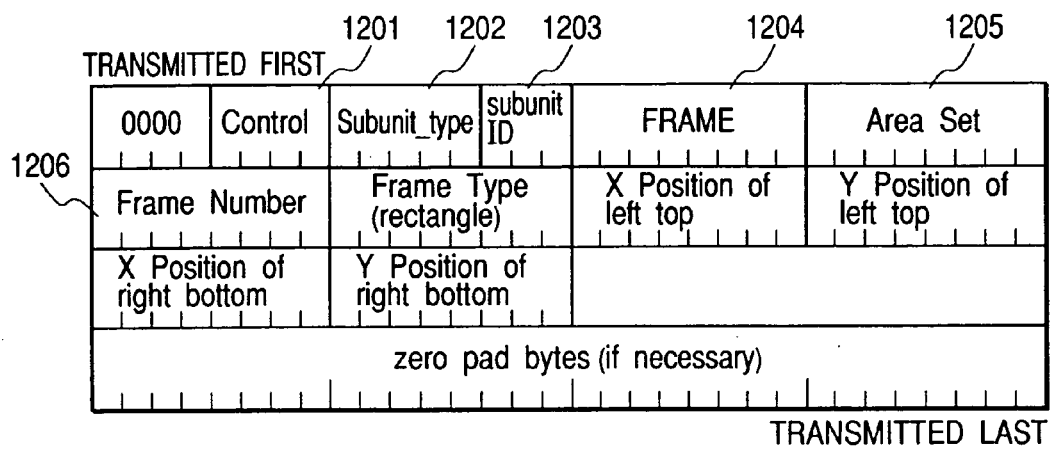
FIG. 12 is a view showing CTS command for setting a rectangular frame.

In FIG. 12, in a ctype field 1201 is set "Control" which indicates that the command is a control command to control the camera sub-unit 11. Data specifying the camera sub-unit 11 of DVCR 10 are stored in Subunit_type field 1202 and Subunit ID field 1203.

Moreover, in FIG. 12, a code indicating a command "FRAME" concerning the frame control is set in an opcode field 1204. A code indicating an area setting command "Area Set" is set in an operand [0] field 1205. A frame number "Frame Number" arbitrarily set on the application is set in an operand [1] field 1206.

Furthermore, in FIG. 12, data indicating a frame type "Frame Type" is set in an operand [2] field. In an operand [3] field a value of X coordinate of the start point of the rectangular frame "X position of left top" is set, and in an operand [4] field a value of Y coordinate of the start point of the rectangular frame "Y position of left top" is set. In an operand [5] field a value of X coordinate of the end point of the rectangular frame "X position of right bottom" is set, and in an operand [6] field a value of Y coordinate of the end point of the rectangular frame "Y position of right bottom" is set.

After receiving the above-described CTS command, the camera sub-unit 11 returns an acknowledgment to the PC 20 (1106).

Moreover, the camera sub-unit 11 executes a processing corresponding to the received CTS command (1107), and additionally prepares CTS response corresponding to the CTS command (1108).

In this case, when the camera sub-unit 11 does not correspond to "Frame Number" and "Frame Type" designated by the CTS command, the DVCR 10 prepares CTS response by setting a response type "Rejected" or "Not Implemented" to the response field. Furthermore, when the camera sub-unit 11 corresponds to "Frame Number" and "Frame Type" designated by the CTS command, the DVCR 10 prepares CTS response by setting a response type "Accepted" to the response field.

Moreover, the camera sub-unit 11 stores the data specifying the sub-unit provided in the target in the Subunit_type field and Subunit ID field of the CTS response. In the opcode field and the operand [0] to operand [n] fields, the same values as those set in the CTS command are set, respectively.

After preparing the CTS response, the camera sub-unit 11 sets the CTS response in Asynchronous packet shown in FIG. 26, and transfers the packet to the PC 20 (1109). The PC 20 returns an acknowledgment of the CTS response to the camera sub-unit 11 (1110).

Subsequently, the PC 20 visually displays on the monitor 22 that the designated rectangular frame is set in the camera sub-unit 11 (1111).

By the above-described communication procedure, the application of the PC 20 can set a rectangular frame area for the taken image of the camera sub-unit 11.

(2-2) Setting of Circular Frame

In the PC 20, the user starts the application to display a screen on the monitor 22 as shown in FIG. 2 (1101).

After the application is started, the user uses the operation unit 23 to operate the control button 2063, and selects a circular frame setting mode from a plurality of modes (1102).

In the circular frame setting mode, the user operates the operation unit 23, and sets a center point of the circular frame for the taken image on the preview screen 201. Subsequently, the user operates the operation unit 23 to set range points of the circular frame. Thereby, a circular area in which a straight line connecting the center point and range points forms a radius is determined as in the frame 208 of FIG. 2 (1103).

After the circular frame is set by the application, the PC 20 prepares CTS command to set the circular frame (1104), and asynchronously transfers the CTS command to the camera sub-unit 11 (1105). In this case, the CTS command prepared in the PC 20 will be described with reference to FIG. 13.

Figure 13:
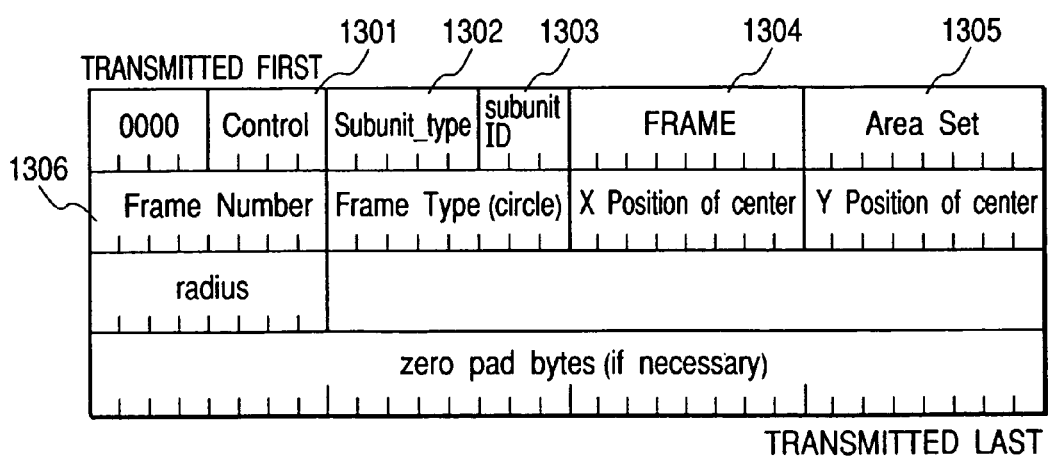
FIG. 13 is a view showing CTS command for setting a circular frame.

In FIG. 13, the data similar to those in FIG. 12 are set in a ctype field 1301, Subunit_type field 1302, Subunit ID field 1303, opcode field 1304, operand [0] field 1305, and operand [1] field 1306.

Moreover, in FIG. 13, data indicating a frame type "Frame Type" is set in an operand [2] field. In an operand [3] field a value of X coordinate of the center point of the circular frame "X position of center" is set, and in an operand [4] field a value of Y coordinate of the center point of the circular frame "Y position of center" is set. In an operand [5] field, a radius of the circular frame "radius" is set.

After receiving the above-described CTS command, the camera sub-unit 11 returns an acknowledgment to the PC 20 (1106).

Moreover, the camera sub-unit 11 executes a processing corresponding to the received CTS command (1107), and additionally prepares CTS response corresponding to the CTS command (1108). Additionally, for the CTS response, data are set in the same procedure as the CTS response of the rectangular frame.

After preparing the CTS response, the camera sub-unit 11 sets the CTS response in Asynchronous packet shown in FIG. 26, and transfers the packet to the PC 20 (1109). The PC 20 returns an acknowledgment of the CTS response to the camera sub-unit 11 (1110).

Subsequently, the PC 20 visually displays on the monitor 22 that the designated circular frame is set in the camera sub-unit 11 (1111).

By the above-described communication procedure, the application of the PC 20 can set a circular frame area for the taken image of the camera sub-unit 11.

(2-3) Setting of Polygonal Frame

In the PC 20, the user starts the application to display a screen on the monitor 22 as shown in FIG. 2 (1101).

After the application is started, the user uses the operation unit 23 to operate the control button 2064, and selects a polygonal frame setting mode from a plurality of modes (1102).

In the polygonal frame setting mode, the user operates the operation unit 23, and sets a start point of the polygonal frame for the taken image on the preview screen 201. Subsequently, the user operates the operation unit 23 to set a second point of the polygonal frame. Furthermore, the user operates the operation unit 23 to set third and subsequent points of the polygonal frame. Thereby, a polygonal area in which the start and second and subsequent points are sequentially connected by a straight line is determined as in the frame 209 of FIG. 2 (1103).

After the polygonal frame is set by the application, the PC 20 prepares CTS command to set the polygonal frame (1104), and asynchronously transfers the CTS command to the camera sub-unit 11 (1105). In this case, the CTS command prepared in the PC 20 will be described with reference to FIG. 14.

Figure 14:
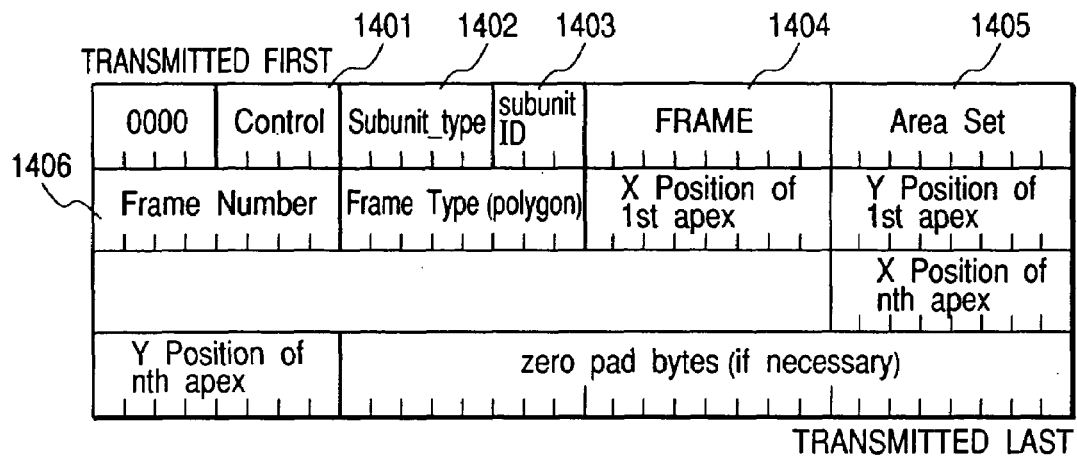
FIG. 14 is a view showing CTS command for setting a polygonal frame.

In FIG. 14, the data similar to those in FIG. 12 are set in a ctype field 1401, Subunit_type field 1402, Subunit ID field 1403, opcode field 1404, operand [0] field 1405, and operand [1] field 1406.

Moreover, in FIG. 14, data indicating a frame type "Frame Type" is set in an operand [2] field. In an operand [3] field the number of polygonal frame sides "Number of sides (n)" is set, and in operand [4] and subsequent fields a value of X coordinate of each apex "X position nth apex" and a value of Y coordinate "Y position nth apex" are set.

After receiving the above-described CTS command, the camera sub-unit 11 returns an acknowledgment to the PC 20 (1106).

Moreover, the camera sub-unit 11 executes a processing corresponding to the received CTS command (1107), and additionally prepares CTS response corresponding to the CTS command (1108). Additionally, in the CTS response, data are set in the same procedure as the CTS response of the rectangular frame.

After preparing the CTS response, the camera sub-unit 11 sets the CTS response in Asynchronous packet shown in FIG. 26, and transfers the packet to the PC 20 (1109). The PC 20 returns an acknowledgment of the CTS response to the camera sub-unit 11 (1110).

Subsequently, the PC 20 visually displays on the monitor 22 that the designated polygonal frame is set in the camera sub-unit 11 (1111).

By the above-described communication procedure, the application of the PC 20 can set a polygonal frame area for the taken image of the camera sub-unit 11.

(2-4) Setting of Pixel Frame

In the PC 20, the user starts the application to display a screen on the monitor 22 as shown in FIG. 2 (1101).

After the application is started, the user uses the operation unit 23 to operate the control button 2065, and selects a pixel frame setting mode from a plurality of modes (1102).

In the pixel frame setting mode, the user operates the operation unit 23, and sets a pixel frame of one pixel for the taken image on the preview screen 201. The pixel frame is set, for example, like the frame 210 of FIG. 2 (1103).

After the pixel frame is set by the application, the PC 20 prepares CTS command to set the pixel frame (1104), and asynchronously transfers the CTS command to the camera sub-unit 11 (1105). In this case, the CTS command prepared in the PC 20 will be described with reference to FIG. 15.

Figure 15:
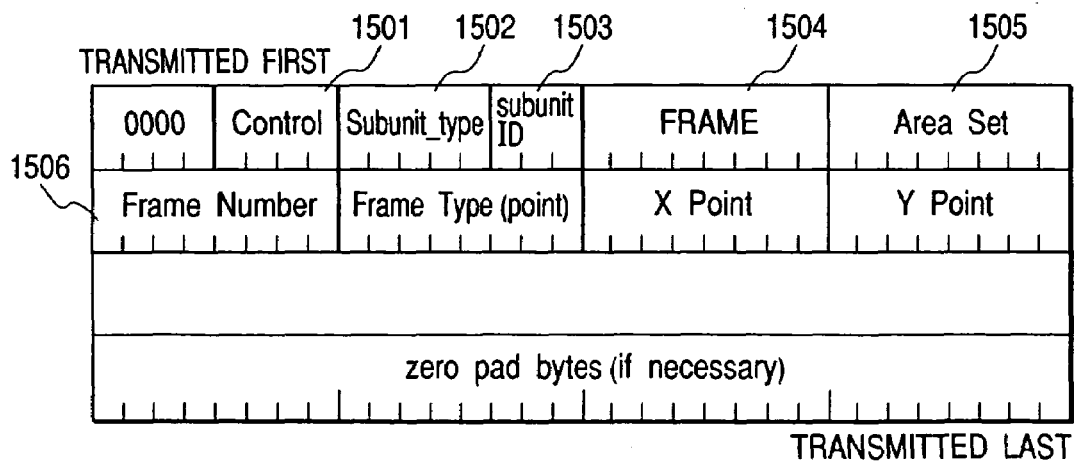
FIG. 15 is a view showing CTS command for setting a pixel frame.

In FIG. 15, the data similar to those in FIG. 12 are set in a ctype field 1501, Subunit_type field 1502, Subunit ID field 1503, opcode field 1504, operand [0] field 1505, and operand [1] field 1506.

Moreover, in FIG. 15, data indicating a frame type "Frame Type" is set in an operand [2] field. In an operand [3] field a value of X coordinate of the pixel frame "X position" is set, and in an operand [4] field a value of Y coordinate of the pixel frame "Y position" is set.

After receiving the above-described CTS command, the camera sub-unit 11 returns an acknowledgment to the PC 20 (1106).

Moreover, the camera sub-unit 11 executes a processing corresponding to the received CTS command (1107), and additionally prepares CTS response corresponding to the CTS command (1108). Additionally, in the CTS response, data is set in the same procedure as the CTS response of the rectangular frame.

After preparing the CTS response, the camera sub-unit 11 uses the CTS response to prepare Asynchronous transfer packet shown in FIG. 5, and asynchronously transfers the packet to the PC 20 (1109). The PC 20 returns an acknowledgment of the CTS response to the camera sub-unit 11 (1110).

Subsequently, the PC 20 visually displays on the monitor 22 that the designated pixel frame is set in the camera sub-unit 11 (1111).

By the above-described communication procedure, the application of the PC 20 can set a pixel frame area for the taken image of the camera sub-unit 11.

(3) Inquiry of Frame Area

Figure 16:
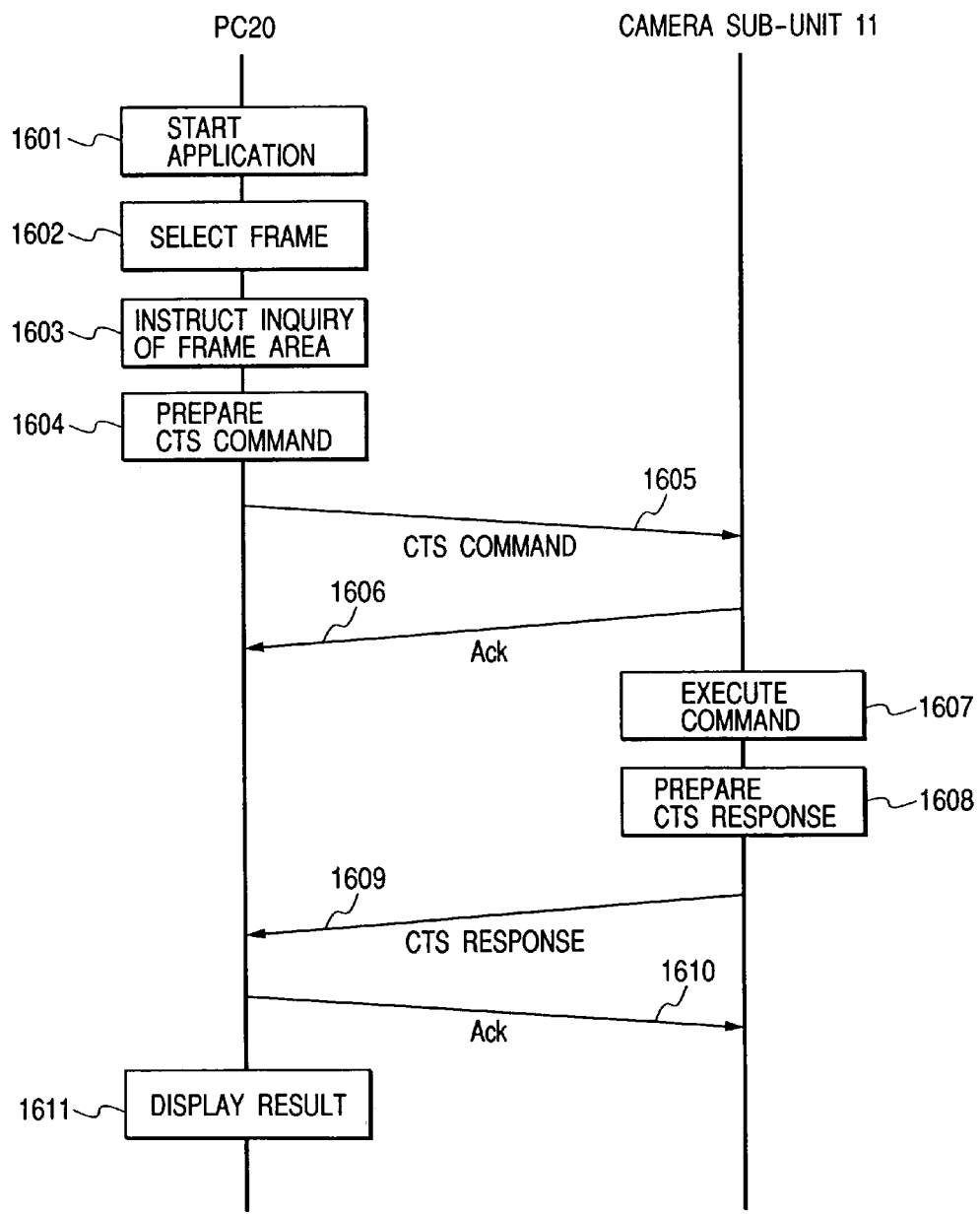
FIG. 16 is a view showing a procedure for inquiring a frame area.

In the embodiment, the application of the PC 20 can inquire of the camera sub-unit 11 about the frame area which is set in the taken image of the camera sub-unit 11. A procedure for inquiring the frame area will be described hereinafter with reference to FIG. 16.

In the PC 20, the user starts the application to display a screen on the monitor 22 as shown in FIG. 2 (1601).

After the application is started, the user uses the operation unit 23 to select a desired frame from preset frames (1602). After the frame is selected, the user uses the operation unit 23 to instruct an inquiry of the frame area (1603).

After confirming the user's instruction input, the PC 20 prepares CTS command to inquire the frame area (1604), and asynchronously transfers the CTS command to the camera sub-unit 11 (1605). In this case, the CTS command prepared in the PC 20 will be described with reference to FIG. 17.

Figure 17:
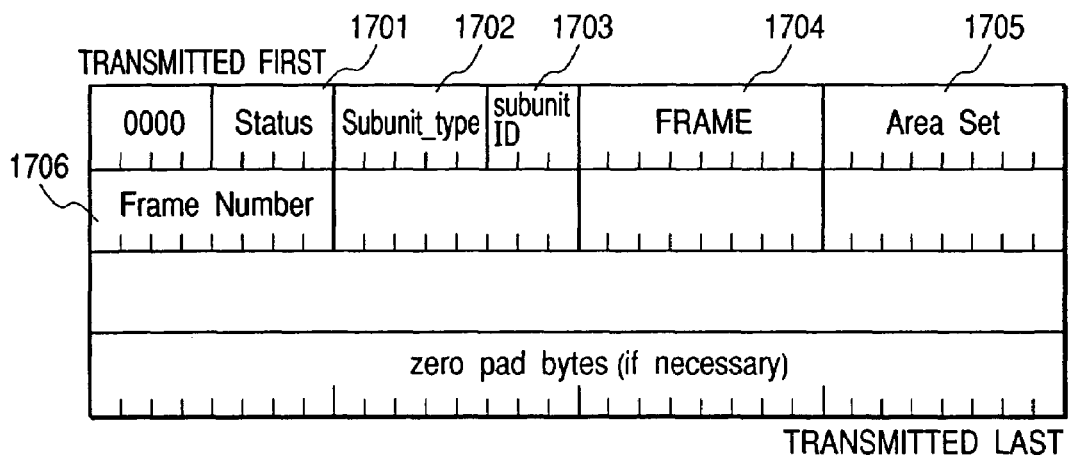
FIG. 17 is a view showing CTS command for inquiring the frame area.

In FIG. 17, in a ctype field 1701 is set "Status" which indicates that the command is a status command to inquire a state of the camera sub-unit 11. Data specifying the camera sub-unit 11 of DVCR 10 are stored in Subunit_type field 1702 and Subunit ID field 1703.

Moreover, in FIG. 17, a code indicating a command "FRAME" concerning the frame control is set in an opcode field 1704. A code indicating an area setting command "Area Set" is set in an operand [0] field 1705. A frame number "Frame Number" of a frame whose area information is to be inquired is set in an operand [1] field 1706.

After receiving the above-described CTS command, the camera sub-unit 11 returns an acknowledgment to the PC 20 (1606).

Moreover, the camera sub-unit 11 executes a processing corresponding to the received CTS command (1607), and additionally prepares CTS response corresponding to the CTS command (1608).

In this case, when the camera sub-unit 11 does not support "Frame Number" designated by the CTS command, the PC 20 prepares CTS response by setting "Rejected" to the response field. Furthermore, when the camera sub-unit 11 corresponds to "Frame Number" and "Frame Type" designated by the CTS command, the PC 20 prepares CTS response by setting "Stable" to the response field.

Moreover, the camera sub-unit 11 stores the data specifying the sub-unit provided in the target in the Subunit_type field and Subunit ID field of the CTS response. In the opcode field and the operand [0] and operand [1] fields, the same values as those set in the CTS command are set, respectively.

Furthermore, in operand [2] and subsequent fields of the CTS response, the area of the designated frame is set using data formats shown in FIGS. 12 to 15. When the area of the designated frame is not set, for example, dummy data like FF (hexadecimal) is set in the operand [2] field.

After preparing the CTS response, the camera sub-unit 11 sets the CTS response in Asynchronous packet shown in FIG. 26, and transfers the packet to the PC 20 (1609).

The PC 20 returns an acknowledgment of the CTS response to the camera sub-unit 11 (1610). Thereafter, the PC 20 uses parameter information included in the CTS response to visually display the area of the selected frame on the monitor 22 (1611).

By the above-described procedure, the PC 20 can confirm the frame area which is set in the taken image of the camera sub-unit 11, and can additionally manage the frame area by the application of the PC 20.

(4) Switching of Display/Not-Display of Object Frame

Figure 18:
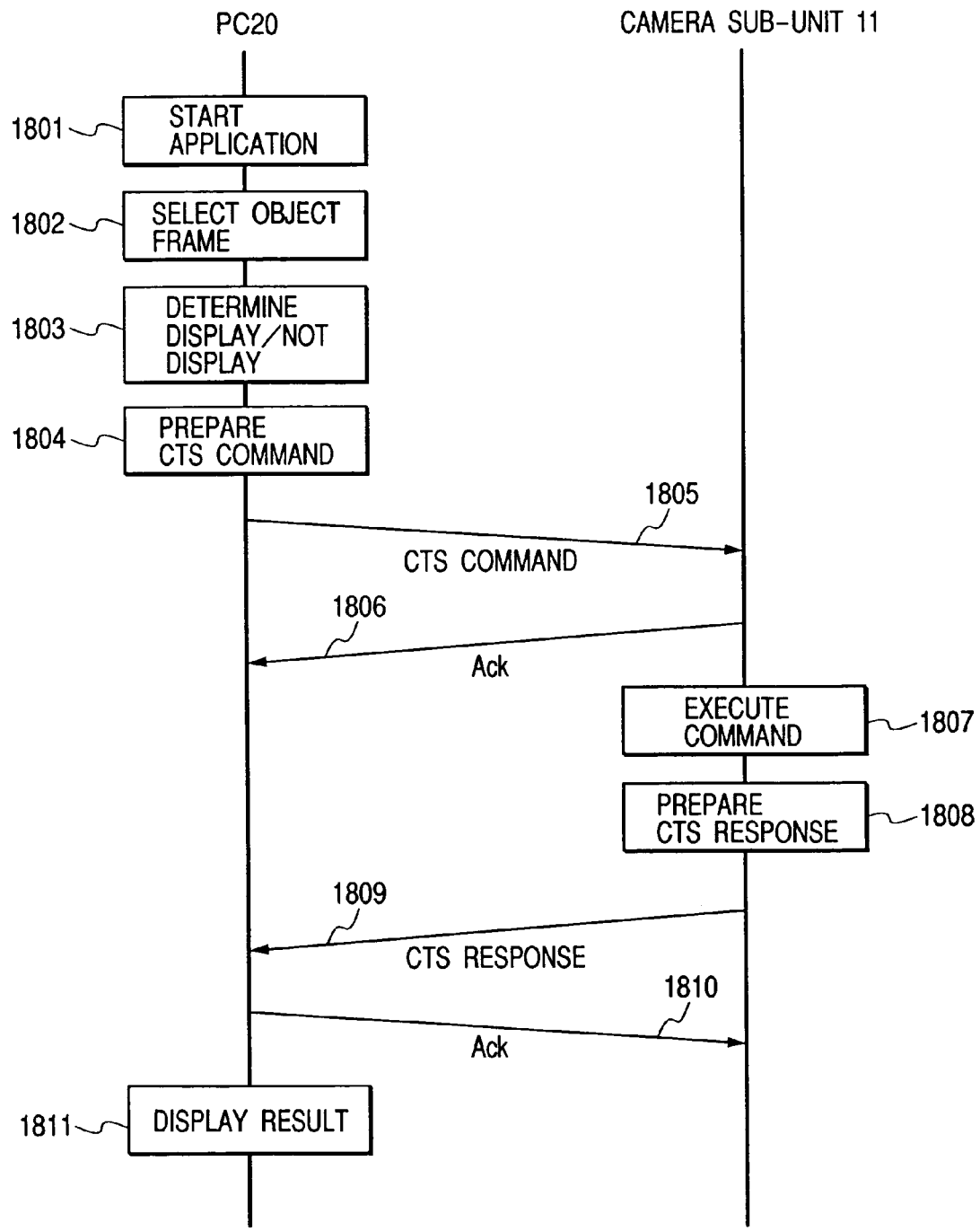
FIG. 18 is a view showing a procedure for instructing displaying/not-displaying of a selected frame.

In the embodiment, the application of the PC 20 can select whether or not the frame set in the taken image of the camera sub-unit 11 is superimposed/displayed on the image. A procedure for switching displaying/not-displaying of the object frame will be described hereinafter with reference to FIG. 18.

In the PC 20, the user starts the application to display a screen on the monitor 22 as shown in FIG. 2 (1801).

After the application is started, the user uses the operation unit 23 to select an object or frame (1802). After the frame is selected, the user uses the operation unit 23 to instruct the displaying/not-displaying of the frame (1803).

After confirming the user's instruction input, the PC 20 prepares CTS command to switch the displaying/not-displaying (1804), and asynchronously transfers the CTS command to the camera sub-unit 11 (1805). In this case, the CTS command prepared in the PC 20 is shown in FIG. 19.

Figure 19:
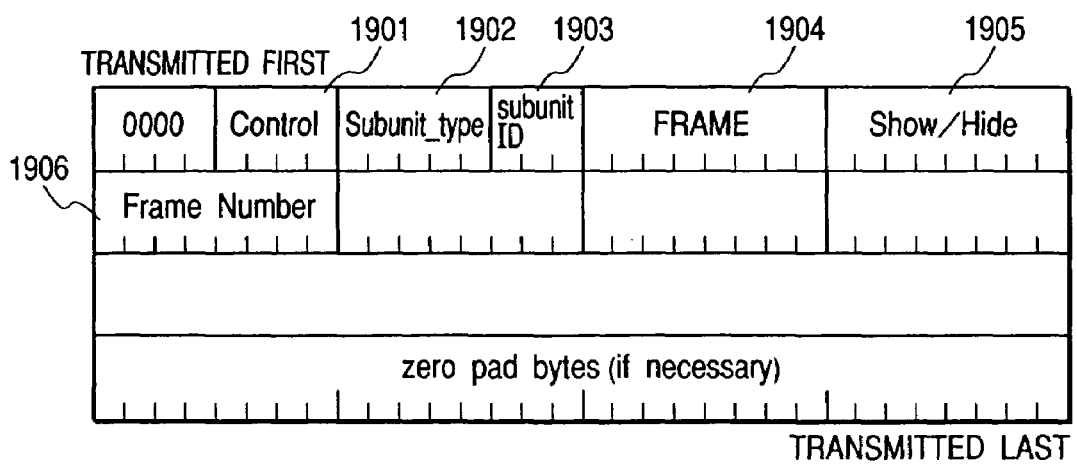
FIG. 19 is a view showing CTS command for instructing the displaying/not-displaying of the selected frame.

In FIG. 19, in a ctype field 1901 is set "Control" which indicates that the command is a control command to control the camera sub-unit 11. Data specifying the camera sub-unit 11 of DVCR 10 are stored in Subunit_type field 1902 and Subunit ID field 1903.

Moreover, in FIG. 19, a code indicating a command "FRAME" concerning the frame control is set in an opcode field 1904. A code designating the displaying/not-displaying "Show/Hide" is set in an operand [0] field 1905. An object or frame number "Frame Number" is set in an operand [1] field 1906.

After receiving the above-described CTS command, the camera sub-unit 11 returns an acknowledgment to the PC 20 (1806).

Moreover, the camera sub-unit 11 executes a processing corresponding to the received CTS command (1807), and additionally prepares CTS response corresponding to the CTS command (1808).

In this case, when the camera sub-unit 11 supports "Frame Number" designated by the CTS command, but the area is not set in the object frame, the PC 20 prepares CTS response by setting "Rejected" to the response field. Furthermore, when the camera sub-unit 11 supports "Frame Number" designated by the CTS command, and the area is set in the object frame, the PC 20 prepares CTS response by setting "Accepted" to the response field.

Moreover, the camera sub-unit 11 stores the data specifying the sub-unit of the target in Subunit_type field and Subunit ID field of the CTS response. In the opcode field and the operand [0] and operand [1] fields, the same values as those set in the CTS command are set, respectively.

After preparing the CTS response, the camera sub-unit 11 sets the CTS response in Asynchronous packet shown in FIG. 26, and transfers the packet to the PC 20 (1809).

The PC 20 returns an acknowledgment of the CTS response to the camera sub-unit 11 (1810). Thereafter, the PC 20 visually displays on the monitor 22 a taken image to be isochronously transferred from the camera sub-unit and the object frame superimposed on the image (1811).

Here, when the CTS response with "Accepted" set therein is transferred, the camera sub-unit 11 switches the displaying/not-displaying of the object frame.

For example, when the object frame is a rectangular, circular, or polygonal frame, and a code "Show" instructing the display of the frame is set in the operand [0] field of the CTS command, the camera sub-unit 11 superimposes an outer rim of the object frame on the taken image, and isochronously transfers the taken image. Moreover, for the pixel frame, cross line display, circular rim display, rectangular rim display or another frame rim centering on the designated pixel is superimposed and displayed on the taken image.

Thereby, the camera sub-unit 11 can supply to the PC 20 the image in which the outer rim of the object frame is superimposed beforehand on the taken image. Moreover, when the DVCR 10 is equipped with a view finder, liquid crystal panel or another display unit, the image with the object frame superimposed on the taken image is also displayed on the display unit.

Additionally, when a code "Hide" instructing the not-displaying of the frame is set in the operand [0] field of the CTS command, the camera sub-unit 11 isochronously transfers the taken image to the PC 20 without overlapping the frame rim of the object frame onto the taken image.

By the above-described procedure, the PC 20 can instruct the displaying/not-displaying of the frame which is set in the taken image of the camera sub-unit 11, and can additionally manage the displaying/not-displaying of the frame by the application of the PC 20.

(5) Setting of Function of Object Frame

Figure 20:
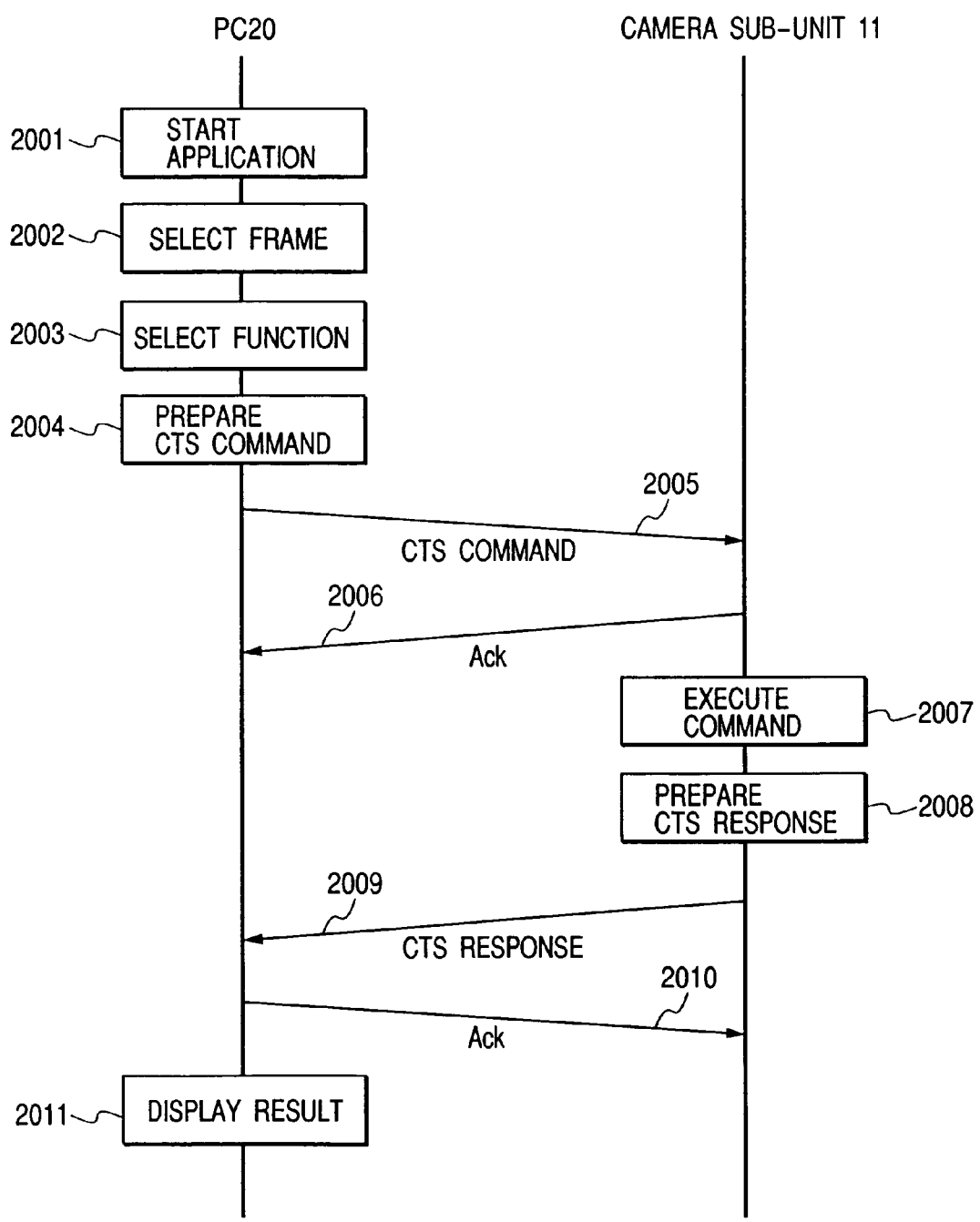
FIG. 20 is a view showing a procedure for controlling a function of the selected frame.

In the embodiment, for the camera sub-unit 11 the application of the PC 20 can set various functions of the frame set in the taken image of the camera sub-unit 11. A procedure for setting the function of the object frame will be described hereinafter with reference to FIG. 20.

In the PC 20, the user starts the application to display a screen on the monitor 22 as shown in FIG. 2 (2001).

After the application is started, the user operates the control button 2061 by the operation unit 23 to select a desired frame (2002). For example, after the control button 2061 is clicked using a mouse, the frame 209 superimposed/displayed on the taken image on the preview screen 201 is double-clicked, so that the desired frame is selected.

After the frame is selected, the application of the PC 20 displays the menu window 211, thereby allowing the user to select various functions to be set to the object frame (2003). Here, examples of the functions which can be selected from the menu window 211 include auto-focusing, automatic exposure, white balance, digital zoom and the like.

After confirming the user's instruction input, the PC 20 prepares CTS command to set a predetermined function to the object frame (2004), and asynchronously transfers the CTS command to the camera sub-unit 11 (2005). In this case, the CTS command prepared in the PC 20 is shown in FIG. 21.

Figures 21, 22:
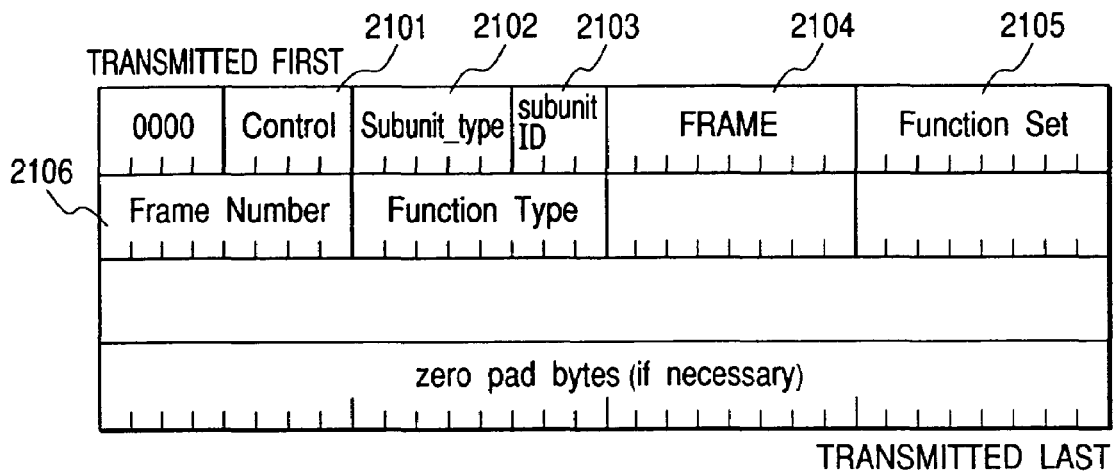
FIG. 21 is a view showing CTS command for controlling the function of the selected frame.
FIG. 22 is a view showing one example of a function which can be controlled by CTS command.

In FIG. 21, a control command "Control" to control the camera sub-unit 11 is set in a ctype field 2101. Data specifying the camera sub-unit 11 of DVCR 10 are stored in Subunit_type field 2102 and Subunit ID field 2103.

Moreover, in FIG. 21, a code indicating a command "FRAME" concerning the frame control is set in an opcode field 2104. A code indicating a function setting command "Function Set" is set in an operand [0] field 2105. A code "Frame Number" indicating an object frame number and a code "Function Type" indicating a function to be set in the object frame are set in operand [1] and operand [2] fields 2106. Here, examples of "Function Type" include functions shown in FIG. 22.

After receiving the above-described CTS command, the camera sub-unit 11 returns an acknowledgment to the PC 20 (2006).

Moreover, the camera sub-unit 11 executes a processing corresponding to the received CTS command (2007), and additionally prepares CTS response corresponding to the CTS command (2008).

In this case, when the camera sub-unit 11 does not support "Frame Number" and "Function Type" designated by the CTS command, the PC 20 prepares CTS response by setting "Rejected" to the response field. Furthermore, when the camera sub-unit 11 supports "Frame Number" and "Function type" designated by the CTS command, the PC 20 prepares CTS response by setting "Accepted" to the response field.

Moreover, the camera sub-unit 11 stores the data specifying the sub-unit of the target in Subunit_type field and Subunit ID field of the CTS response. In the opcode field and the operand [0] and operand [1] fields, the same values as those set in the CTS command are set, respectively.

After preparing the CTS response, the camera sub-unit 11 asynchronously transfers the CTS response to the PC 20 (2009). After receiving the CTS response, the PC 20 returns an acknowledgment of the CTS response to the camera sub-unit 11 (2010).

Here, the camera sub-unit 11 sets the function of the object frame in response to the received CTS command. For example, when "Function Type" included in the CTS command is auto-focusing "Auto Focus", the camera sub-unit 11 auto-focuses the entire taken image based on the image of the object frame area, and isochronously transfers the result. Moreover, when "Function Type" included in the CTS command is digital zoom "Zoom", the camera sub-unit 11 zooms up the entire taken image based on the image of the object frame area, and isochronously transfers the result.

After returning the acknowledgment to the camera sub-unit 11, the PC 20 visually displays on the monitor 22 that the desired function is set in the object frame, and additionally displays the taken image prepared based on the function (2011).

For example, the application of the embodiment can change a color for displaying the outer rim of the object frame in accordance with the function selected/set by the user. In FIG. 2, when the function set in the frames 207 to 210 is the auto-focusing, the application displays the outer rim of the frame in red. When it is the white balance, the outer rim of the frame can be displayed in yellow. When such processing is performed on each frame, the function set in each frame can be visually displayed, and user interface can be enhanced further.

When the user is to select another frame and to set a desired function for the frame, by repeatedly performing the above-described procedure, various functions can be set for a plurality of frames.

By the above-described procedure, the PC 20 can set various functions for the frame which is set in the taken image of the camera sub-unit 11, and can additionally manage the function of each frame by the application of the PC 20.

Additionally, in the embodiment, the case where one function is set for the object frame has been described, but the present invention is not limited thereto. The embodiment may be constructed in such a manner that CTS command for setting the function is set a plurality of times, or a plurality of function types are set in one CTS command, such CTS command is transferred, and a plurality of functions are set for the object frame.

(6) Inquiry of Object Frame Function

Figure 23:
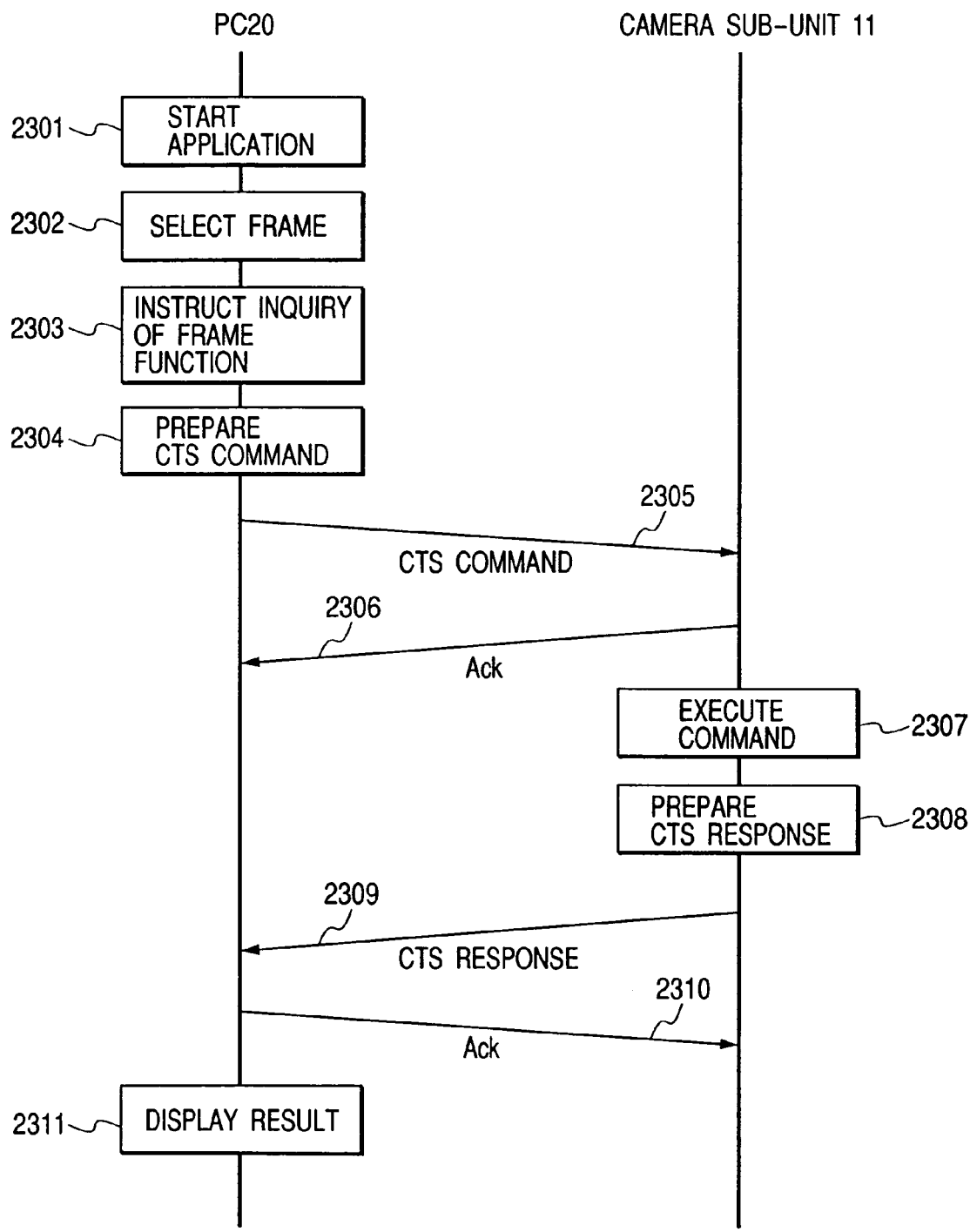
FIG. 23 is a view showing a procedure for inquiring a function of the selected frame.

In the embodiment, the application of the PC 20 can inquire of the camera sub-unit 11 about the function of the frame which is set in the taken image of the camera sub-unit 11. A procedure for inquiring the function in the object frame will be described hereinafter with reference to FIG. 23.

In the PC 20, the user starts the application to display a screen on the monitor 22 as shown in FIG. 2 (2301).

After the application is started, the user operates the control button 2061 or the like of the operation unit 23 to select an object or frame (2302). For example, after the control button 2061 is clicked using a mouse, the frame 209 superimposed/displayed on the taken image on the preview screen 201 is double-clicked, so that the desired frame is selected.

After the object frame is selected, the user operates the operation unit 23 to instruct an inquiry of the frame function for the frame (2303).

After confirming the user's instruction input, the PC 20 prepares CTS command to inquire the object frame function (2304), and asynchronously transfers the CTS command to the camera sub-unit 11 (2305). In this case, the CTS command prepared in the PC 20 is shown in FIG. 24.

Figure 24:
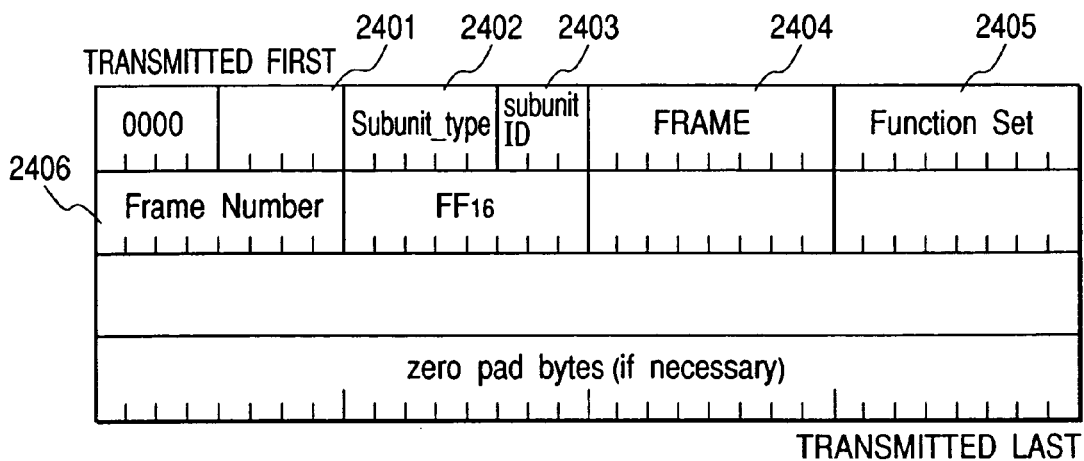
FIG. 24 is a view showing CTS command for inquiring the function of the selected frame.

In FIG. 24, in a ctype field 2401, a control command "Control" to control the camera sub-unit 11 is set. Data specifying the camera sub-unit 11 of DVCR 10 are stored in Subunit_type field 2402 and Subunit ID field 2403.

Moreover, in FIG. 24, a code indicating a command "FRAME" concerning the frame control is set in an opcode field 2404. A code indicating a function setting command "Function Set" is set in an operand [0] field 2405. A code indicating an object frame number "Frame Number" and dummy data "FF (hexadecimal)" are set in operand [1] and operand [2] fields 2406.

After receiving the above-described CTS command, the camera sub-unit 11 returns an acknowledgment to the PC 20 (2306).

Moreover, the camera sub-unit 11 executes a processing corresponding to the received CTS command (2307), and additionally prepares CTS response corresponding to the CTS command (2308).

In this case, when the camera sub-unit 11 does not support "Frame Number" designated by the CTS command, the PC 20 prepares CTS response by setting "Rejected" to the response field. Furthermore, when the camera sub-unit 11 supports "Frame Number" designated by the CTS command, the PC 20 prepares CTS response by setting "Stable" to the response field.

Moreover, the DVCR 10 stores the data specifying the sub-unit provided in the target in Subunit_type field and Subunit ID field of the CTS response. In the opcode field and the operand [0] and operand [1] fields, the same values as those set in the CTS command are set, respectively.

Furthermore, the DVCR 10 sets a code indicating the function set in the object frame into an operand [2] field of the CTS response. Examples of the code include data shown in FIG. 22. When the function is not set in the object frame, dummy data FF (hexadecimal) is set.

After preparing the CTS response, the camera sub-unit 11 uses the CTS response to prepare Asynchronous transfer packet shown in FIG. 5, and asynchronously transfers the packet to the PC 20 (2309).

The PC 20 returns an acknowledgment of the CTS response to the camera sub-unit 11 (2310). Thereafter, the PC 20 visually displays the function of the object frame on the monitor 22 based on the CTS response (2311).

By the above-described procedure, the PC 20 can confirm the frame function set in the taken image of the camera sub-unit 11, and can additionally manage the function which can be set in each frame by the application of the PC 20.

Additionally, in the first embodiment, the present invention can variously be embodied without departing from spirits, or main characteristics thereof.

For example, in the embodiment, the storage medium 24 has been described as the hard disc, but is not limited thereto. The storage medium may be a floppy disc, optical disc, optical magnetic disc, CD-ROM, CD-R, magnetic tape, non-volatile memory card, ROM or the like as long as it can supply the program code for realizing the embodiment to the control unit 21.

Moreover, the program code stored in the storage medium 24 of the embodiment may be recorded beforehand, or supplied from the outside via the digital interface 40 before recorded in the storage medium 24.

Therefore, the above-described embodiment is only an illustration in all respects, and should not be restrictedly construed.

Also, though the embodiment is explained according to an example, that is data communication system based upon the IEEE 1394 standard, the present invention can be applied to other data communication system. That is, it is possible to apply to data communication systems which can utilize a data communication method assuring real-time data transfer of the moving image data etc. as Isochronous transfer system and a data communication method transferring necessary information to a designated device without preventing the real-time data communication as Asynchronous transfer system.

As described above, according to the first embodiment, the setting and inquiring of the frame of the taken image of the target, and the setting and inquiring of various functions of the frame can be remote-operated from the controller.

Particularly, by the remote operation, the controller can confirm the maximum number of frames which can be set in the taken image of the target.

Moreover, by the remote operation, the controller can set a plurality of frames having different areas, or shapes for the taken image of the target.

Furthermore, by the remote operation, the controller can confirm the frame area which is preset in the taken image of the target.

Additionally, by the remote operation, the controller can instruct the displaying/not-displaying of the frame set in the taken image of the target.

Moreover, by the remote operation, the controller can set various functions for the frame set in the taken image of the target.

Furthermore, by the remote operation, the controller can confirm the function of the frame set in the taken image of the target.

Second Embodiment

In a second embodiment, an operation environment will be described in which IEEE 1394 serial bus or another network is connected to a target having a display unit and a controller for remote-operating the display unit, and the controller is used to control a displayed image of the display unit.

Moreover, in the second embodiment, an operation environment will be described in which IEEE 1394 serial bus or another network is connected to a target having a camera unit and a controller for remote-operating the camera unit, and the controller is used to control a taken image of the camera unit.

Furthermore, in the second embodiment, an operation environment will be described in which IEEE 1394 serial bus or another network is connected to a first target having a display unit, a second target having a camera unit and a controller for remote-operating the display unit and the camera unit, and a displayed image of the display unit and a taken image of the camera unit are controlled.

Figure 25A:
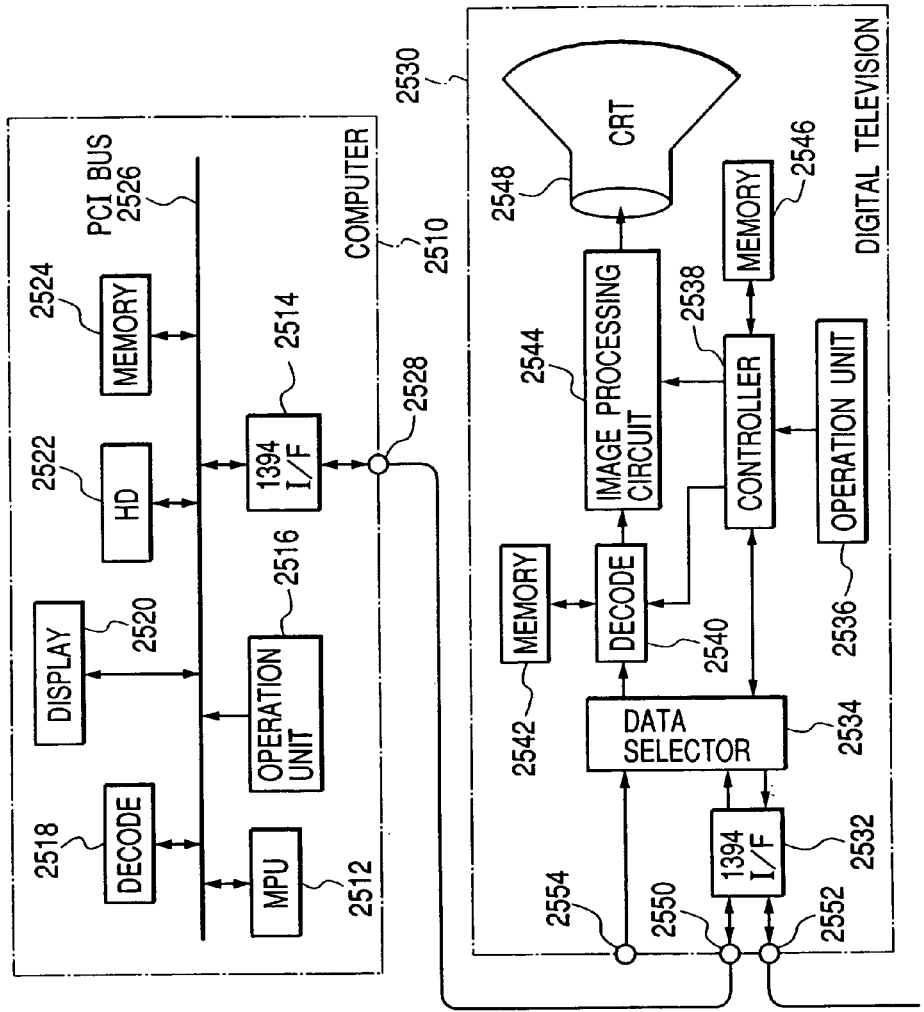
FIG. 25 which is comprised of FIGS. 25A and 25B are block diagrams showing a constitution of a data communication system of a second embodiment.
Figure 25:
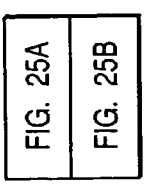
Figure 25B:
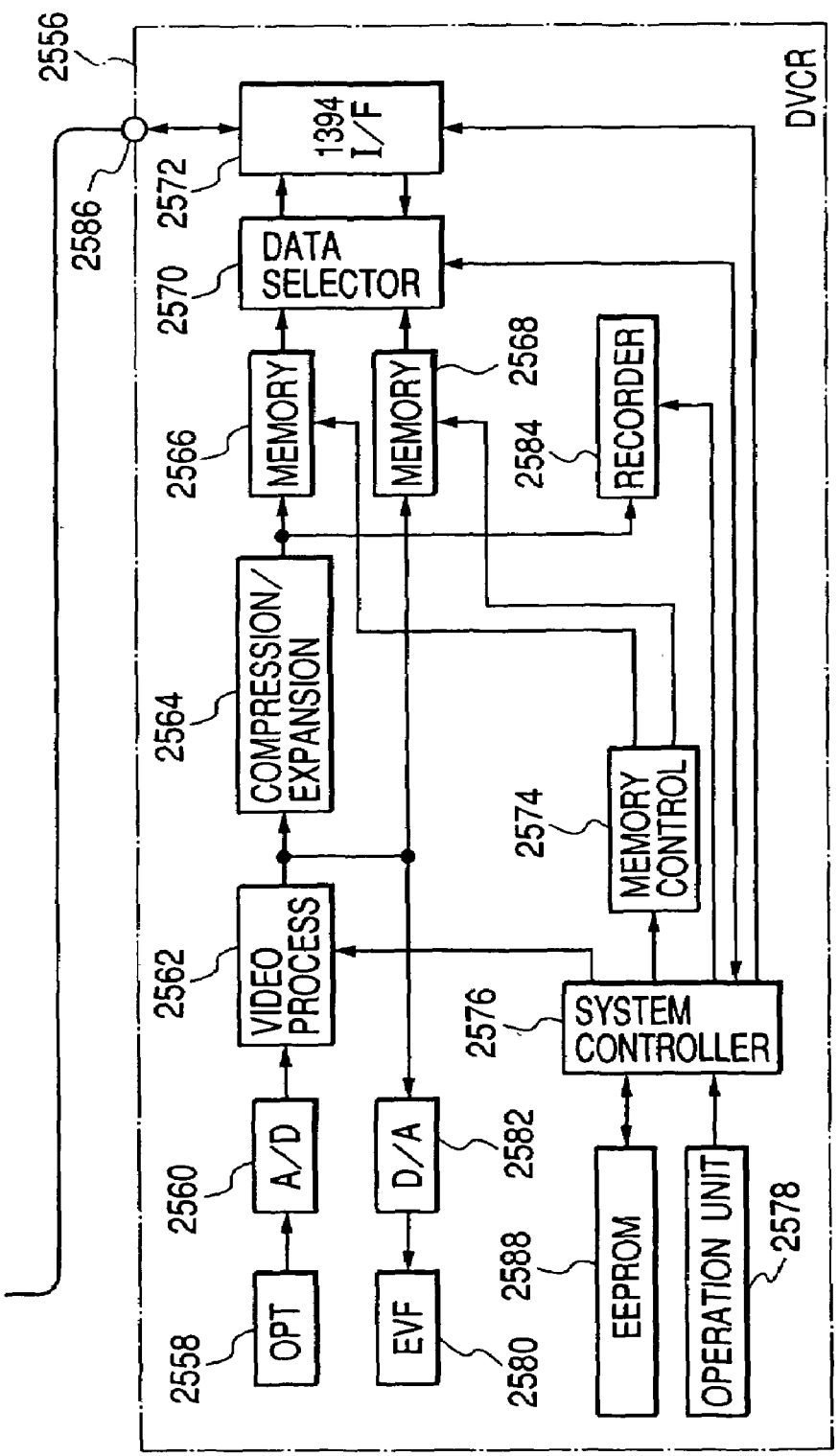

In FIGS. 25A and 25B, numeral 2510 denotes a computer, 2512 denotes an operation processing unit (MPU), 2514 denotes a first 1394 interface, 2516 denotes a first operation unit comprising a keyboard, mouse and the like, 2518 denotes a first decode, 2520 denotes CRT display or another display unit, 2522 denotes a hard disc, 2524 denotes a first memory, 2526 denotes PCI bus or another computer internal bus, and 2528 denotes a first 1394 interface terminal.

Numeral 2530 denotes a digital television (hereinafter referred to as DTV), 2532 denotes a second 1394 interface, 2534 denotes a first data selector, 2536 denotes a second operation unit, 2538 denotes a TV controller, 2540 denotes a second decode, 2542 denotes a second memory, 2544 denotes an image processing circuit, 2546 denotes a third memory, and 2548 denotes a display unit including a cathode ray tube (hereinafter referred to as CRT) and the like.

Numeral 2550 denotes a second 1394 interface terminal, 2552 denotes a third 1394 interface terminal, 2554 denotes an image input terminal, 2556 denotes a camera incorporating type digital video recorder (hereinafter referred to as DVCR), 2558 denotes an image pickup unit including an image pickup optical system, 2560 denotes an A/D converter, 2562 denotes a video processing unit, 2564 denotes a compression/expansion circuit, 2566 denotes a fourth memory, 2568 denotes a fifth memory, 2570 denotes a second data selector, and 2572 denotes a third 1394 interface.

Numeral 2574 denotes a memory control circuit, 2576 denotes a system controller, 2578 denotes a third operation unit, 2580 denotes an electronic view finder, 2582 denotes a D/A converter, 2584 denotes a recorder or another recording section (hereinafter referred to as the recorder), 2586 denotes a fourth 1394 interface terminal, and 2588 denotes EEPROM or another writable read only memory (hereinafter referred to as EEPROM).

The computer 2510, DTV 2530, and DVCR 2556 are nodes, and the nodes are interconnected via the first to third 1394 interfaces 2514, 2532, 2572. The nodes can transmit/receive data, or can mutually perform remote operation or the like by a command described later.

In the embodiment, for example, the computer 2510 operates as a controller for controlling a flow of image signals on the 1394 serial bus, or as a controller for remote-operating the DTV 2530 and DVCR 2556.

An internal constitution of the computer 2510 will next be described. The PCI bus or another computer internal bus 2526 is interconnected to the control unit (including MPU) 2512, 1394 interface 2514, first operation unit 2516, decoder 2518, display unit (including CRT display) 2520, hard disc 2522, internal memory 2524 and another device.

The control unit 2512 executes software recorded in the hard disc 2522, and additionally moves various data to the internal memory 2524. Moreover, the control unit 2512 also performs adjusting operation of the devices interconnected via the PCI bus 2526.

The 1394 interface 2514 receives an image signal transferred on the 1394 serial bus, and additionally transmits an image signal recorded in the hard disc 2522 and an image signal stored in the internal memory 2524 via the 1394 interface terminal 2528. The image signals are transmitted using Isochronous communication. Moreover, the 1394 interface 2514 asynchronously transfers CTS command for another apparatus connected on the 1394 serial bus via the first 1394 interface terminal 2528.

Moreover, the 1394 interface 2514 transfers a signal transferred onto the 1394 serial bus to another 1394 node via the 1394 interface terminal 2528.

An operator allows the MPU 2512 to execute the software recorded in the hard disc 2522 through the operation unit 2516 comprising the keyboard, mouse and the like. The software and another information are presented to the operator by the display unit 2520 including the CRT display and the like.

The decoder 2518 decodes the image signal received from the 1394 serial bus through the software. The decoded image signal is also presented to the operator by the display unit 2520.

The inner constitution of the DTV 2530 will next be described.

In the embodiment, the DTV 2530 operates as an image output device. The second 1394 interface 2532 receives the image signal transferred onto the 1394 serial bus and command data for controlling the DTV 2530 via the 1394 serial bus, 1394 interface terminal 2550, and 1394 interface terminal 2552.

The image signal is received, for example, using Isochronous transfer. Moreover, the 1394 interface 2532 asynchronously transfers the CTS response to the CTS command. Furthermore, the 1394 interface 2532 transfers to another node the signal transferred onto the 1394 serial bus.

The received image data is transmitted to the decoder 2540 through the data selector 2534. The decoder 2540 temporarily stores the image data in the memory 2542 to decode the data, and transmits an output to the image processing circuit 2544. The image processing circuit 2544 applies various processings to the decoded image data, then transmits an output to the display unit (including CRT) 2548 for display. Additionally, means constituting the display unit 2548 is not limited to the CRT, and needless to say, a liquid crystal display device, plasma device, or another display device can be used.

On the other hand, the received CTS command is transmitted to the TV controller 2538 through the data selector 2534. In response to the CTS command, the TV controller 2538 allows the data selector 2570 to switch input signals, allows the image processing circuit 2544 to control image qualities of output images, and performs other controls about various images. Moreover, the TV controller 2538 stores image quality control information of the output images in the memory 2546.

Moreover, for example, digital and analog image signals are transmitted from an image input apparatus (not shown) via the image input terminal 2554. The inputted digital signal is transmitted to the decoder 2540 through the data selector 2534.

The decoder 2540 temporarily stores the image data in the memory 2542 to decode the data, and transmits an output to the image processing circuit 2544. The image processing circuit 2544 applies various processings to the decoded image data, then transmits an output to the display unit 2548 for display.

Switching of image input to any one of the 1394 interfaces 2550, 2552 and the image input terminal 2554 is performed by the data selector 2534. When the input terminal is set by the operation unit 2536, or the received CTS command, the TV controller 2538 instructs the data selector 2534 to set inputs. Following the instruction of the input setting, the data selector 2534 outputs an appropriate input signal.

An internal constitution of the DVCR 2556 will next be described.

In the embodiment, the DVCR 2556 operates as an input device of image signals. A luminance signal (Y) and color-difference signal (C) of the image transmitted from the image pickup unit 2558 are converted to digital data by the A/D converter 2560. The digital data is multiplexed by the video processing unit 2562. Subsequently, the data amount of the image information is compressed by the compression/expansion circuit 2564.

Generally, YC is independently provided with the compression processing circuit, but here for the simplicity of the description, an example of a compression processing in YC time division is described. Subsequently, a shuffling processing is applied for the purpose of strengthening the image data against a transmission line error. An object of the processing is to convert a continuous code error or burst error to a random error as a discrete error which can easily be corrected or interpolated.

In addition, to make much of an object of uniforming a deviation of generation of information amount by coarseness in the image screen, when the processing is performed before the compression processing, run length or another variable length code is conveniently used. In response to this, data identification (ID) information for restoring the data shuffling is added.

The ID added by the ID adding operation, together with simultaneously recorded mode information and the like of the above-described system, is used as auxiliary information for a reverse compression processing (information amount expansion processing) during reproduction. In order to reduce an error during the reproduction of the data, error correction (ECC) information is added. The processing till the addition of such redundancy signal is applied for each independent record area corresponding to each image, voice or another information.

As described above, the image signal with ID and ECC information added thereto is recorded in a magnetic tape or another recording medium by the recorder 2584, and additionally stored temporarily in the fourth memory 2566 described later.

On the other hand, the image data multiplexed by the video processing unit 2562 is digital-analog converted by the D/A converter 2582, and observed with the electronic view finder 2580 by the operator. Moreover, the operator transmits various operation information to the system controller 2576 via the operation unit 2578. The system controller 2576 controls the entire DVCR 2556 by the operation information.

Moreover, the image data multiplexed by the video processing unit 2562 is transmitted to the memory 2568, and temporarily stored. Operations of the memories 2566 and 2568 are controlled by the system controller 2576 via the memory control circuit 2574.

The data selector 2570 selects the data from the memories 2566 and 2568 to transfer the data to the 1394 interface 2572, or selects the data from the 1394 interface 2532 to transfer the data to the memory 2566 or the memory 2568. By the above-described operation, from the 1394 interface 2572 in the DVCR 2556, the compressed image data and non-compressed image data can be selected by the operator for Isochronous transfer.

The 1394 interface 2572 receives CTS command for controlling the DVCR 2556 via the 1394 serial bus and the 1394 interface terminal 2586. The received CTS command is transmitted to the system controller 2576 through the data selector 2570.

The system controller 2576 prepares CTS response for the CTS command, and transmits the CTS response to the 1394 serial bus through the data selector 2534 and the third 1394 interface 2572.

Moreover, in response to the command data, the system controller 2576 also performs a control on the recorder 2584 and the video processing unit 2562. The video processing unit 2562 adjusts the image quality of the video signal to be recorded by the control from the system controller 2576.

The image quality adjustment information is written in the EEPROM 2588, and can be stored even if main power of the DVCR 2556 is cut off. The writing of the image quality adjustment information into the EEPROM 2588 is performed, for example, when 1394 connector of an arbitrary apparatus in the bus is pulled off, or when a bus reset accompanied by the power cutting-off of the arbitrary apparatus in the bus is detected.

Figure 27A:
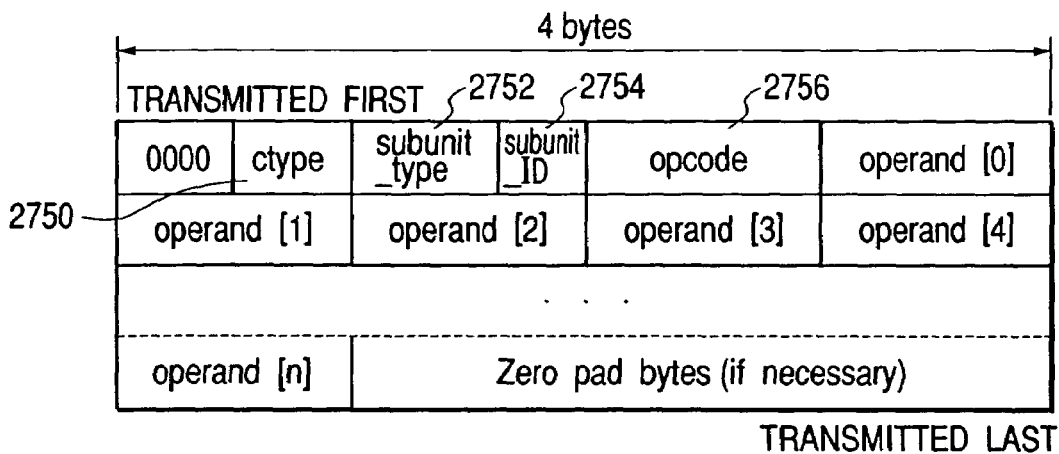
FIGS. 27A and 27B are views showing data formats of CTS command and CTS response of the second embodiment.
Figure 27B:
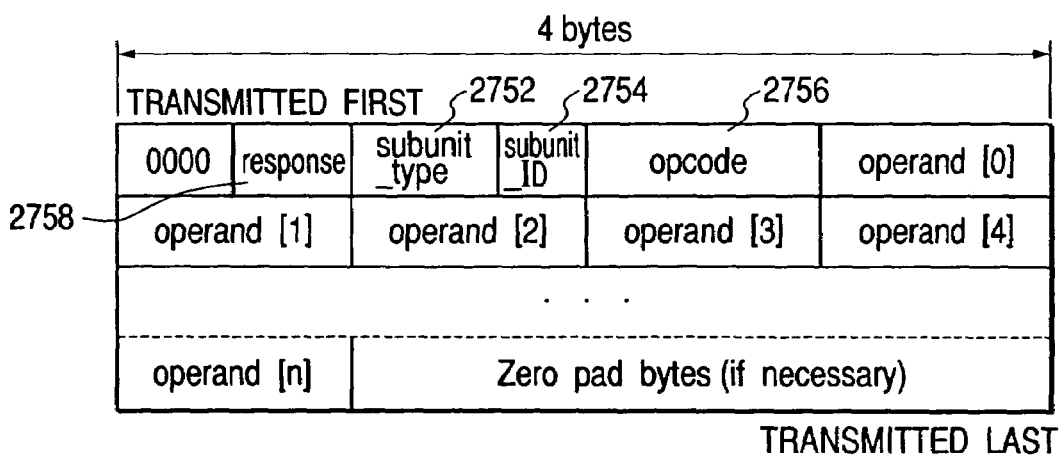

FIGS. 27A and 27B show frame structures of CTS command and CTS response for use in the second embodiment.

FIG. 27A shows the command frame structure, and FIG. 27B shows the response frame structure.

In FIG. 27A, numeral 2750 denotes a command type (hereinafter referred to as ctype) field, 2752 denotes a sub-unit type (hereinafter referred to as subunit_type) field, 2754 denotes a sub-unit ID (hereinafter referred to as subunit_ID) field, and 2756 denotes an operation code (hereinafter referred to as opcode).

In FIG. 27A, after the opcode 2756, till the nth byte, each byte of operand [0], operand [1], . . . , and operand [n] continues.

The ctype 2750 (4 bits) shows the command type. One example of a relationship of the value of the ctype 2750 and the command type is shown in the following Table 1.

TABLE 1

| code (binary) MSB LSB | Command Type |
| --- | --- |
| 0000 | CONTROL |
| 0001 | STATUS |
| 0010 | SPECIFIC INQUIRY |
| 0011 | NOTIFY |
| 0100 | GENERAL INQUIRY |
| 0101 | (reserved) |
| 0110 | (reserved) |
| 0111 | (reserved) |

In Table 1, when the value of the ctype 2750 is CONTROL, the controller controls the target. The control content is designated by the operand and opcode described later. Moreover, when the value of the ctype 2750 is STATUS, the controller inquires the current state of the target. The state is designated by the operand and opcode described later.

Moreover, when the value of the ctype 2750 is NOTIFY, the controller notifies by the target that the state of the target is changed. The state is designated by the operand and opcode described later in the same manner as STATUS command.

Furthermore, when the value of the ctype 2750 is SPECIFIC INQUIRY, or GENERAL INQUIRY, it is confirmed whether or not the CONTROL command having the same opcode is mounted on the target.

In the SPECIFIC INQUIRY command, the opcode and all operands have to be designated, but in the GENERAL INQUIRY command, only the opcode is designated. This respect is a difference between the two INQUIRY commands.

With the subunit_type 2752 (5 bits) and the subunit_ID 2754 (3 bits), the sub-unit to which the CTS command is to be sent is identified.

The subunit is a virtual entry which is identified as only one in one node (hereinafter referred to as the unit) and which provides a consistent function set.

One unit can have a plurality of subunits. Therefore, the subunit_type 2752 and the subunit_ID 2754 indicate an address for identifying a certain subunit which is present in one unit.

The following Table 2 shows one example of a relationship of a value of subunit_type 2752 and a subunit type. The subunit_type 2752 and subunit_ID 2754 are generically referred to as a subunit address.

Additionally, when the value of the subunit_type 2752 is "$1F_{16}$" and the value of the subunit_ID 2754 is "$3_{16}$", the subunit address indicates the unit.

When the CTS command is transmitted to the display unit 2548 of the DTV 2530 in the embodiment, for example, a value "$0000_2$" is designated in the subunit_type 2752, and a value "$000_2$" is designated in the subunit_ID 2754. Moreover, when the command is transmitted to the camera unit 2558 of the DVCR 2556 in the embodiment, for example, a value "$00111_2$" is designated in the subunit_type 2752, and a value "$000_2$" is designated in the subunit_ID 2754. Furthermore, when the command is transmitted to a VCR subunit of the DVCR 2556 in the embodiment, a value "$00100_2$" is designated in the subunit_type 2752, and a value "$000_2$" is designated in the subunit_ID 2754.

The opcode 2756 defines a control content to be performed, and a state returned by the CTS response described later. The number and meaning of subsequent operands differ in accordance with the contents of the ctype, subunit_type and opcode.

TABLE 2

| Code (binary) MSB LSB | Subunit Type |
| --- | --- |
| 00000 | Video Monitor |
| 00001 | (reserved) |
| 00010 | (reserved) |
| 00011 | disc recorder/player |
| 00100 | Video Cassette Recorder (VCR) |
| 00101 | Tuner |
| 00110 | (reserved) |
| 00111 | Video Camera |
| 01000 | (reserved) |
| . | |
| . | |
| . | |

TABLE 2-continued

| Code (binary) MSB LSB | Subunit Type |
|---|---|
| 11011 | |
| 11100 | Vendor unique |
| 11101 | (reserved) |
| 11110 | Extended subunit_type |
| 11111 | Unit |

In FIG. 27B, the same reference numerals as those in FIG. 27A denote fields indicating the same functions. Moreover, in FIG. 27B, numeral 2758 denotes a response field (hereinafter referred to as response). The response 2758 indicates a CTS response type. Table 3 shows one example of a relationship of a value of response 2758 and the response type.

TABLE 3

| code (binary) MSB LSB | Response |
|---|---|
| 1000 | NOT IMPLEMENTED |
| 1001 | ACCEPTED |
| 1010 | REJECTED |
| 1011 | IN TRANSITION |
| 1100 | IMPLEMENTED/STABLE |
| 1101 | CHANGED |
| 1110 | (reserved) |
| 1111 | INTERIM |

The target prepares the corresponding CTS response by the ctype 2750, subunit address 2752, 2754, opcode 2756, and operand of the CTS command transmitted from the controller, and returns it to the controller.

The CTS command for remote-operating the DTV 2530 of the embodiment will next be described. In the embodiment, for example, CTS commands shown in Table 4 are defined. These are commands for controlling an image displayed by the display unit 2548 of the DTV 2530.

Figure 30:
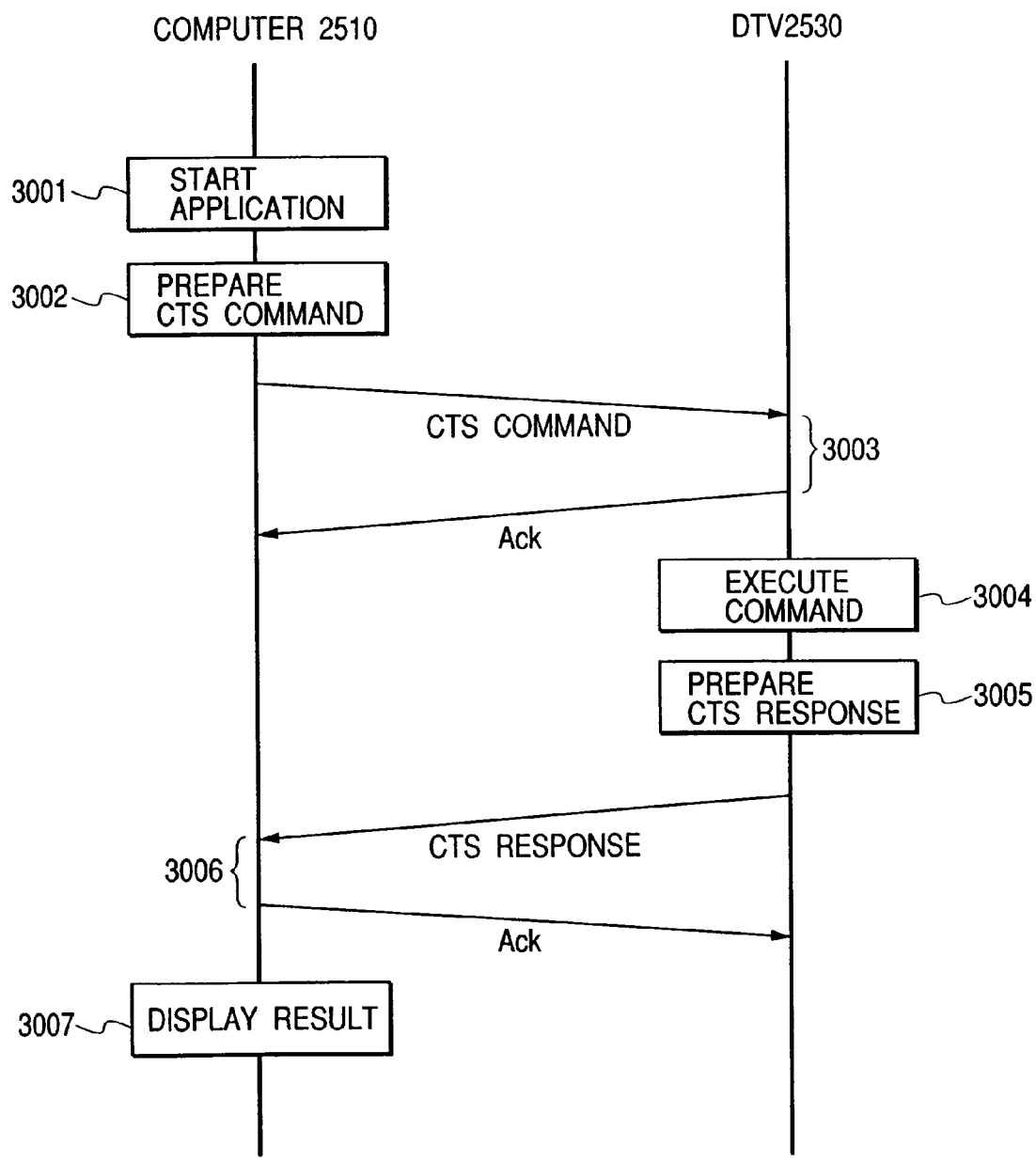
FIG. 30 is a view showing a procedure for remote-controlling a displayed image.

The commands shown in Table 4 are transferred to the target or DTV 2530 from the controller or computer 2510 by a procedure shown in FIG. 30. The procedure for remote-operating a display screen of DTV 2530 will be described hereinafter with reference to FIG. 30.

The controller 2512 of the computer 2510 reads a program stored in HD 2522, and starts an application for remote-operating the display unit of DTV 2530 (3001).

After the application is started, the user operates the operation unit 2516 to select a function to be controlled. The user can select six types of functions: APERTURE; BRIGHTNESS; CHROMA; CONTRAST; PHASE; and INPUT SIGNAL MODE. The CTS commands shown in Table 4 correspond to these functions, and each command is prepared in accordance with a user's request for operation (3002).

CTS command types shown in Table 4 and functions corresponding to the commands will be described hereinafter.

TABLE 4

| Name | opcode value |
|---|---|
| APERTURE | $40_{16}$ |
| BRIGHTNESS | $41_{16}$ |
| CHROMA | $42_{16}$ |
| CONTRAST | $43_{16}$ |
| PHASE | $44_{16}$ |
| INPUT SIGNAL MODE | $79_{16}$ |

In Table 4, APERTURE is a command by which a contour compensating function on the display screen of the DTV 2530 is controlled and the current state is inquired. When the control is performed on the contour compensating function, CONTROL is set in the ctype 2750 of the CTS command. Moreover, when the current state is inquired for the contour compensating function, STATUS is set in the ctype 2750 of the CTS command.

With the APERTURE command with CONTROL being set therein, for example, one operand is designated. The controller or computer 2510 transmits the CTS command with a value of eight bits being set in the operand as APERTURE CONTROL command (3003).

Upon receiving the APERTURE CONTROL command, the DTV 2530 sets the contour compensation in accordance with the operand (3004). Additionally, the opcode value of the APERTURE command is not limited to "$40_{16}$", and another value may be defined. Moreover, the number of operands to be designated is not limited to one, and needless to say, one or more operands may be designated.

In Table 4, BRIGHTNESS is a command by which the brightness on the display screen of the DTV 2530 is controlled and the current state is inquired. When the brightness on the display screen is controlled, CONTROL is set in the ctype 2750. Moreover, when the current state is inquired for the brightness on the display screen, STATUS is set in the ctype 2750.

With the BRIGHTNESS command with CONTROL being set therein, for example, one operand is designated. The controller or computer 2510 transmits the CTS command with a value of eight bits being set in the operand as BRIGHTNESS CONTROL command (3003).

Upon receiving the BRIGHTNESS CONTROL command, the DTV 2530 adjusts the brightness on the display screen in accordance with the operand (3004). For example, when the operand has a large value, the display screen is set bright. When the operand has a small value, the display screen is set dark. Additionally, the opcode value of the BRIGHTNESS command is not limited to "$41_{16}$", and another value may be defined. Moreover, the number of operands to be designated is not limited to one, and needless to say, one or more operands may be designated.

In Table 4, CHROMA is a command by which color density on the display screen of the DTV 2530 is controlled and the current state is inquired. When the color density is controlled, CONTROL is set in the ctype 2750. Moreover, when the current state is inquired for the color density, STATUS is set in the ctype 2750.

With the CHROMA command with CONTROL set therein, for example, one operand is designated. The controller or computer 2510 transmits the CTS command with a value of eight bits set in the operand as CHROMA CONTROL command (3003).

Upon receiving the CHROMA CONTROL command, the DTV 2530 adjusts the color density on the display screen in accordance with the operand (3004). For example, when the operand has a large value, deep color is displayed. When the operand has a small value, light color is displayed. Additionally, the opcode value of the CHROMA command is not limited to "$42_{16}$", and another value may be defined. Moreover, the number of operands to be designated is not limited to one, and one or more operands may be designated.

In Table 4, PHASE is a command by which tint on the display screen of the DTV 2530 is controlled and the current state is inquired. When the tint is controlled, CONTROL is set in the ctype 2750. Moreover, when the current state is inquired for the tint, STATUS is set in the ctype 2750.

With the PHASE command with CONTROL being set therein, for example, one operand is designated. The controller or computer 2510 transmits the CTS command with a value of eight bits being set in the operand as PHASE CONTROL command (3003).

Upon receiving the PHASE CONTROL command, the DTV 2530 adjusts the tint on the display screen in accordance with the operand (3004). For example, when the operand has a large value, green is displayed strong. When the operand has a small value, purple is set to be displayed strong. Additionally, the opcode value of the PHASE command is not limited to "$44_{16}$", and another value may be defined. Moreover, the number of operands to be designated is not limited to one, and one or more operands may be designated.

In the above-described constitution, the image quality adjustment of the image displayed by the DTV 2530 on the 1394 serial bus can easily be remote-operated by the computer 2510 or another control device.

In Table 4, INPUT SIGNAL MODE is a command by which a type of an image signal to be transmitted to the DTV 2530 is designated, or a type of an image signal being transmitted to the DTV 2530 is inquired.

Figure 28:
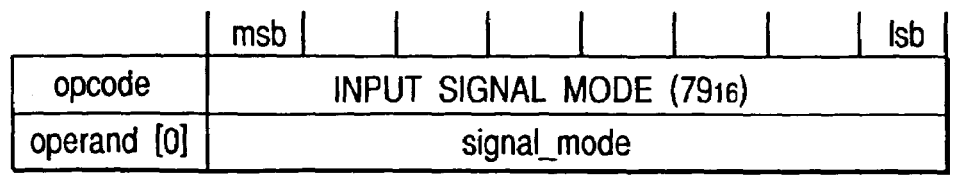
FIG. 28 is a view showing a data format of INPUT SIGNAL MODE CONTROL COMMAND of the second embodiment.

FIG. 28 is a view showing a data format of the INPUT SIGNAL MODE command on and after the opcode. In FIG. 28, signal_mode to be set in the operand [0] indicates the type of the input image signal. Table 5 shows codes to be set in the signal_mode and an example of each content.

TABLE 5

| Value | Signal mode |
|---|---|
| $00_{16}$ | SD 525-60 |
| $04_{16}$ | SDL 525-60 |
| $08_{16}$ | HD 1125-60 |
| $80_{16}$ | SD 625-50 |
| $84_{16}$ | SDL 625-50 |
| $88_{16}$ | HD 1250-50 |
| $10_{16}$ | MPEG 25 Mbps-60 |
| $14_{16}$ | MPEG 12.5 Mbps-60 |
| $18_{16}$ | MPEG 6.25 Mbps-60 |
| $90_{16}$ | MPEG 25 Mbps-50 |
| $94_{16}$ | MPEG 12.5 Mbps-50 |
| $98_{16}$ | MPEG 6.25 Mbps-50 |
| $01_{16}$ | D-VHS Digital |
| $05_{16}$ | Analog VHS NTSC 525/60 |
| $25_{16}$ | Analog VHS M-PAL 525/60 |
| $A5_{16}$ | Analog VHS PAL 625/50 |
| $B5_{16}$ | Analog VHS N-PAL 625/50 |
| $C5_{16}$ | Analog VHS SECAM 625/50 |
| $D5_{16}$ | Analog VHS ME-SECAM 625/50 |
| $0D_{16}$ | Analog S-VHS 525/60 |
| $ED_{16}$ | Analog S-VHS 625/50 |
| $30_{16}$ | Baseband 525-60/422 Component Digital |
| $32_{16}$ | Baseband 525-60 Composite Digital |
| $34_{16}$ | Baseband 525-60/411 Digital |
| $B0_{16}$ | Baseband 625-50/422 Component Digital |
| $B2_{16}$ | Baseband 625-50 Composite Digital |
| $B4_{16}$ | Baseband 625-50/420 Digital |

In the above-described constitution, the DTV 2530 of the embodiment can be adapted to various types of image signals, can know beforehand the type of the image signal to be inputted, and can notify another apparatus of the type of the image signal being inputted.

After the processing corresponding to each CTS command is executed, the controller 2538 of the DTV 2530 prepares the CTS response corresponding to the CTS command (3005). Subsequently, the 1394 interface 2532 of the DTV 2530 packetizes the CTS response into Asynchronous packet shown in FIG. 26, and write transaction of the packet into a response register of the computer 2510 is performed (3006). The controller 2512 of the computer 2510 distinguishes the content of the CTS response, and displays a result of the CTS command on the display 2520 (3007).

By the above-described procedure, the computer 2510 can remote-operate the image displayed by the display unit 2548 of the DTV 2530, and can additionally manage the displayed image of the display unit 2548 by the application of the computer 2510.

A command for remote-operating the DVCR 2556 of the embodiment will next be described. In the embodiment, for example, commands shown in Table 6 are defined. These are commands for controlling an image taken by the image pickup unit 2558 of the DVCR 2556.

Each command shown in Table 6 is transferred to the target or DVCR 2556 from the controller or computer 2510 by a procedure shown in FIG. 31. A procedure for remote-operating a display screen of the DVCR 2556 will be described hereinafter with reference to FIG. 31.

The controller 2512 of the computer 2510 reads a program stored in the HD 2522, and starts an application for remote-operating the image pickup unit of the DVCR 2556 (3101).

After the application is started, the user operates the operation unit 2516 to select a function to be controlled. The user can select eight types of functions: AE MODE; AE LOCK; APERTURE CORRECTION; GAIN; GAMMA; KNEE; WHITE BALANCE; and OUTPUT SIGNAL MODE. CTS commands shown in Table 6 correspond to these functions, and each command is prepared in response to the user's request for operation (3102).

Types of the CTS commands shown in Table 6 and the functions corresponding to the commands will be described hereinafter.

TABLE 6

| Name | opcode value |
|---|---|
| AE MODE | $40_{16}$ |
| AE LOCK | $41_{16}$ |
| APERTURE CORRECTION | $50_{16}$ |
| GAIN | $51_{16}$ |
| GAMMA | $52_{16}$ |
| KNEE | $53_{16}$ |
| WHITE BALANCE | $5D_{16}$ |
| OUTPUT SIGNAL MODE | $78_{16}$ |

In Table 6, AE MODE CONTROL command is used to control an automatic exposure system. Moreover, AE MODE STATUS command is used to inquire the automatic exposure system.

Furthermore, AE LOCK CONTROL command is used to fix exposure to a constant value, i.e., to control so-called AE LOCK. Additionally, AE LOCK STATUS command is used to inquire the current AE LOCK state.

The APERTURE CORRECTION CONTROL command is used to control the contour compensating function of the camera. Moreover, APERTURE CORRECTION STATUS command is used to inquire the current contour compensating function state of the camera.

The GAIN CONTROL command is used to control a gain of a signal processing system in the DVCR 2556. A value of the gain can be controlled for luminance, color difference, or RGB or another signal type. Moreover, GAIN STATUS command is used to inquire the current gain value. In the same manner as the GAIN CONTROL command, GAIN STATUS command can inquire the gain value for the luminance, color difference, or RGB or another signal type.

The GAMMA CONTROL command is used to control a gamma value. The gamma value can be controlled for the luminance, color difference, or RGB or another signal type. Moreover, GAMMA STATUS command is used to inquire the current gamma value. In the same manner as the GAMMA CONTROL command, GAMMA STATUS command can inquire the gamma value for the luminance, color difference, or RGB or another signal type.

The KNEE CONTROL command is used to set a knee slope and knee point.

The KNEE STATUS command is used to inquire the current knee slope and knee point.

The WHITE BALANCE CONTROL command is used to set a white balance of the camera. In the setting of the white balance, parameters of both the color temperature conversion information and the setting in the current light source can be set. The WHITE BALANCE STATUS command is used to inquire the current camera white balance.

The OUTPUT SIGNAL MODE CONTROL command designates a type of a signal outputted by the camera sub-unit in the DVCR 2556. The OUTPUT SIGNAL MODE STATUS command is used to inquire the type of the signal outputted by the camera sub-unit in the DVCR 2556.

The OUTPUT SIGNAL MODE has one operand, and designates a type of a signal outputted by the operand. For a code value of the operand, the same value as the code value of the signal_mode field in the INPUT SIGNAL MODE command of the DTV 2530 is used.

After the processing corresponding to each CTS command is executed, the controller 2576 of the DVCR 2556 prepares CTS response corresponding to the CTS command (3105). Subsequently, the 1394 interface 2572 of the DVCR 2556 packetizes the CTS response into Asynchronous packet shown in FIG. 26, and write transaction of the packet into a response register of the computer 2510 is performed (3106). The controller 2512 of the computer 2510 distinguishes the content of the CTS response, and displays a result of the CTS command on the display 2520 (3107).

By the above-described procedure, the computer 2510 can remote-operate the image taken by the image pickup unit 2558 of the DVCR 2556, and can additionally manage the taken image of the image pickup unit 2558 by the application of the computer 2510.

Figure 29:
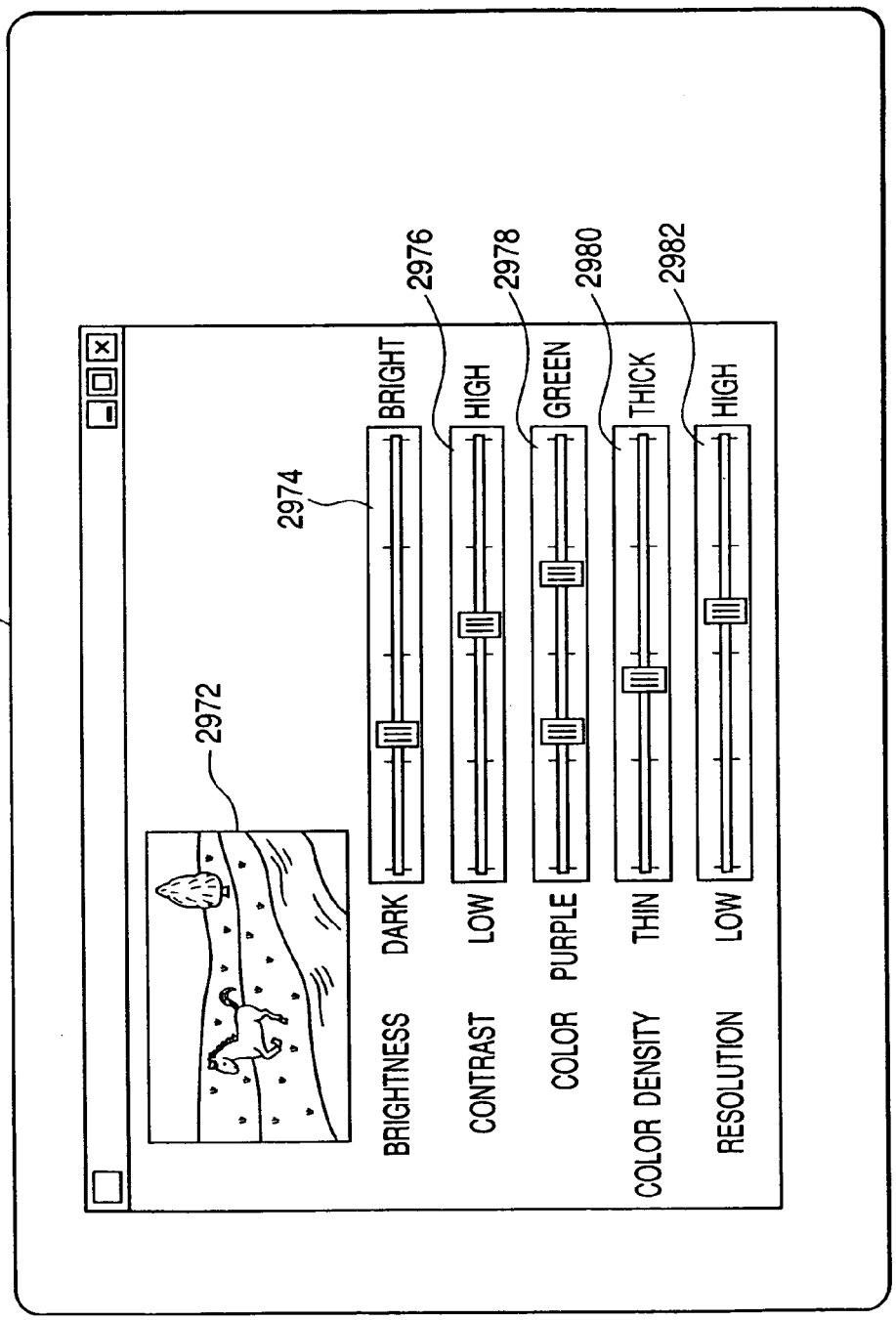
FIG. 29 is a view showing one example of a graphical user interface of the second embodiment.

FIG. 29 shows one example of a graphical user interface (hereinafter referred to as GUI) of an image quality setting application operated on the computer 2510. The application performs an image quality adjustment of the DTV 2530 using the above-described CTS command.

In FIG. 29, numeral 2970 denotes a monitor screen, 2972 denotes an image preview screen, 2974 denotes a brightness adjustment sliding bar for adjusting brightness, 2976 denotes a contrast adjustment sliding bar for adjusting contrast, 2978 denotes a color adjustment sliding bar for adjusting tint, 2980 denotes a color density adjustment sliding bar for adjusting color density, and 2982 denotes a resolution adjustment sliding bar for adjusting resolution.

When the brightness adjustment sliding bar 2974 is moved to the right, for example, the brightness of the display surface of the DTV 2530 is set to become bright. The application generates an operand of the BRIGHTNESS CONTROL command in accordance with a position of the brightness adjustment sliding bar 2974, and transmits the operand to the DTV 2530.

When the contrast adjustment sliding bar 2976 is moved to the right, for example, the contrast of the display surface of the DTV 2530 is set to become large. The application generates an operand of the CONTRAST CONTROL command in accordance with a position of the contrast adjustment sliding bar 2976, and transmits the operand to the DTV 2530.

When the color adjustment sliding bar 2978 is moved to the right, for example, the DTV 2530 is set to display green strong. When the bar is moved to the left, purple is displayed strong. The application generates an operand of the PHASE CONTROL command in accordance with a position of the color adjustment sliding bar 2978, and transmits the operand to the DTV 2530.

When the color density adjustment sliding bar 2980 is moved to the right, for example, the color of the DTV 2530 is set to become deep. The application generates an operand of the CHROMA CONTROL command in accordance with a position of the color density adjustment sliding bar 2980, and transmits the operand to the DTV 2530.

When the resolution adjustment sliding bar 2982 is moved to the right, for example, the contour compensating function is set strong in the display surface of the DTV 2530, and the resolution of the display surface is set high. Moreover, when the resolution adjustment sliding bar 2982 is moved to the left, the contour compensating function is set weak, and the resolution of the display surface is lowered.

The application generates an operand of the APERTURE CONTROL command in accordance with a position of the resolution adjustment sliding bar 2982, and transmits the operand to the DTV 2530.

While observing the DTV 2530, or the preview screen 2972, the operator of the application adjusts the above-described plurality of adjustment bars 2974 to 2982 to adjust the image quality of the DTV 2530.

After the operator performs the image quality adjustment of the DTV 2530, the computer application generates a command of the DVCR 2556 corresponding to the image quality setting of the DTV 2530 to transmit the command to the DVCR 2556.

For example, when the brightness is adjusted by the application, the GAIN CONTROL command and GAMMA CONTROL command to the video camera sub-unit in the DVCR 2556 are generated corresponding to the generated BRIGHTNESS command to the DTV 2530, and transmitted to the DVCR 2556.

Moreover, in the case where the brightness is adjusted as described above, after the automatic exposure mode is set by the AE MODE CONTROL command, exposure may be set in accordance with the set brightness by the AE LOCK CONTROL command.

Furthermore, when the tint is adjusted by the application, the application generates the WHITE BALANCE CONTROL command for the video camera unit in response to the generated PHASE CONTROL command for the DTV 2530, and transmits the command to the DVCR 2556.

Additionally, when the color density is adjusted by the application, the application generates the GAIN CONTROL command of the color-difference signal for the video camera unit in response to the generated CHROMA CONTROL command for the DTV 2530, and transmits the command to the DVCR 2556.

Moreover, when the resolution is adjusted by the application, the application generates the APERTURE CORRECTION CONTROL command for the video camera unit in response to the generated APERTURE CONTROL command for the DTV 2530, and transmits the command to the DVCR 2556.

In the DVCR 2556, by the received camera command, the system controller 2576 in the DVCR 2556 allows the video processing unit 2562 to perform a processing corresponding to the command, and stores the image quality setting information in the EEPROM 2588. By the above-described operation, the DVCR 2556 adjusts a photographing image quality, and additionally holds the image quality setting information even if the power supply to the DVCR 2556 is cut off.

By the above-described operation, the communication device in the embodiment can set the image quality of the DTV 2530 or another image output device, and can additionally reflect the content of the image quality setting in the photographing image quality setting of the DVCR 2556 or another photographing device and store the content.

Moreover, since the photographing image quality of the DVCR 2556 or another photographing device can be set on the DTV 2530 or another image output device, different from the prior art, the menu incorporated in the photographing device does not have to be used, and operating properties and visibility can remarkably be enhanced.

Furthermore, While the photographing device of the embodiment is connected to the 1394 bus, the image quality can be set. Therefore, the effect of the image quality adjustment can effectively be recognized easily. Additionally, the image output device of the embodiment is not limited to the DTV 2530 and needless to say, various image display devices such as a liquid crystal monitor, plasma display, and another monitor device can be used.

Moreover, there is a demerit that a stand-by time is lengthened by a printing time, but needless to say, a printer, copying machine and the like can be used.

Furthermore, the photographing device of the embodiment can be applied not only to the camera incorporating type VCR and another video camera but also to a still video camera, digital camera and any other photographing device. Moreover, the device is not limited to the camera device, and needless to say, the device can be applied to a film scanner, flat bed scanner or another scanner device, or to a draft scanner section of the copying machine or the like.

Moreover, the control node of the embodiment is not limited to the computer or another electronic calculator, and needless to say, another apparatus may be used. Furthermore, the control node of the embodiment does not have to be an independent apparatus, and needless to say, either the image output device or the photographing device may be constituted to operate as the control node.

Also, though the embodiment is explained according to an example, that is data communication system based upon the IEEE 1394 standard, the present invention can be applied to other data communication system. That is, it is possible to apply to data communication systems which can utilize a data communication method assuring real-time data transfer of the moving image data etc. as Isochronous transfer system and a data communication method transferring necessary information to a designated device without preventing the real-time data communication as Asynchronous transfer system.

Other Embodiments of the Invention

The present invention may be applied to a system constituted of a plurality of apparatuses (e.g., host computer, interface apparatus, reader, printer and the like), or to a device constituted of one apparatus.

Moreover, in order to operate various devices to realize the above-described function of the embodiment, the program code of the software for realizing the function of the embodiment is supplied to a device connected to the various devices, or to the computer in the system, so that the various devices are operated in accordance with the program stored in the system or in the computer of the device (CPU or MPU). Such implementation is also included in the category of the present invention.

Furthermore, in this case, the program code itself of the software realizes the function of the embodiment, and the program code itself, and means for supplying the program code to the computer, e.g., the storage medium with the program code stored therein constitute the present invention. As the storage medium for storing the program code, for example, a floppy disc, hard disc, optical disc, optical magnetic disc, CD-ROM, magnetic tape, non-volatile memory card, ROM, or the like can be used.

Moreover, when the computer executes the supplied program code, the above-described function of the embodiment is realized. Additionally, the program code cooperates with OS (operating system) operated in the computer or another application software to realize the function of the embodiment. Needless to say, such program codes are included in the embodiment of the present invention.

Furthermore, after the supplied program code is stored in a memory provided in a function expansion board of a computer or a function expansion unit connected to the computer, based on an instruction of the program code, CPU or the like provided in the function expansion board or the function expansion unit performs a part or the whole of the actual processing, and by the processing the above-described function of the embodiment is realized. Needless to say, this case is also included in the present invention.

In the second embodiment, as described above, when various data are transmitted/received among a plurality of terminal devices connected via the data communication bus to perform a predetermined processing, the image quality adjustment data is transmitted via the data communication bus, and operation is performed in accordance with the image quality adjustment data in the terminal device which has received the image quality adjustment data. Therefore, the image quality setting of the image display device can be remote-operated, and the operating properties and visibility can remarkably be enhanced. Moreover, according to other characteristics of the present invention, the content of the image quality setting can be reflected on the side of the set terminal device. Furthermore, according to other characteristics of the present invention, the content of the image quality setting can be stored in the storage means.

Moreover, according to the second embodiment, since the image quality adjustment data transmitted via the data communication bus is received to change the photographing image quality, the content of the image quality setting of the image display device can be reflected in the photographing image quality setting of the photographing device. Furthermore, according to other characteristics of the present invention, the content of the photographing image quality setting can be stored in the storage medium. Thereby, without using the menu or the like incorporated in the photographing device, the photographing image quality can be set by the remote operation, and the operating properties and visibility of the photographing device can remarkably be enhanced.

Moreover, according to the second embodiment, while the photographing device is connected to the 1394 bus, the image quality setting can be performed, so that the effect of the image quality adjustment can easily be recognized.

What is claimed is:

1. A method of controlling an image capture apparatus, the control method comprising:
    a reception step of receiving an image captured by the image capture apparatus;
    a frame setting step of setting a shape, a position, and an area of a frame;
    a first command sending step of sending a first command to the image capture apparatus in order to set the frame within the image captured by the image capture apparatus,
    wherein the first command indicates the shape, the position, and the area set in the frame setting step;
    a function selection step of selecting a function to be set in the frame; and
    a second command sending step of sending a second command to the image capture apparatus, wherein the second command indicates the function selected in the function selection step.

2. A method according to claim 1, wherein the shape of the frame to be set in the frame setting step is rectangular, circular, polygonal, or one pixel.

3. A method according to claim 1, further comprising a display step of displaying the frame on the captured image.

4. A method according to claim 1, wherein the function to be selected in the function selection step includes a focus, an exposure, a white balance, or a digital zoom.

5. A method according to claim 1, further comprising a display step of displaying the frame on the captured image.

6. A method according to claim 5, further comprising a color change step of changing a color of a rim of the frame according to the function selected in the function selection step.

7. A control apparatus controlling an image capture apparatus, comprising:
    a communication unit adapted to receive an image captured by the image capture apparatus; and
    a control unit coupled to the communication unit, wherein the control unit is adapted to control;
    a frame setting process of setting a shape, a position, and an area of a frame;
    a first command sending process of sending a first command to the image capture apparatus in order to set the frame within the image captured by the image capture apparatus, wherein the first command indicates the shape, the position, and the area set in the frame setting process;
    a function selection process of selecting a function to be set in the frame; and
    a second command sending process of sending a second command to the image capture apparatus, wherein the second command indicates the function selected in the function selection process.

8. A control apparatus according to claim 7, wherein the shape of the frame to be set in the frame setting process is rectangular, circular, polygonal, or one pixel.

9. A control apparatus according to claim 7, wherein the control unit is adapted to control a display process of displaying the frame on the captured image.

10. A control apparatus according to claim 7, wherein the function to be selected in the function selection process includes a focus, an exposure, a white balance, or a digital zoom function.

11. A control apparatus according to claim 7, wherein the control unit is adapted to control a display process of displaying the frame on the captured image.

12. A control apparatus according to claim 11, wherein the control unit is adapted to control a color change process of changing a color of a rim of the frame according to the function selected in the function selection process.

13. A storage medium which stores software for executing a method of controlling an image capture apparatus, the method comprising:
    a reception step of receiving an image captured by the image capture apparatus;
    a frame setting step of setting a shape, a position, and an area of a frame;
    a first command sending step of sending a first command to the image capture apparatus in order to set the frame within the image captured by the image capture apparatus, wherein the first command indicates the shape, the position, and the area set in the frame setting step;
    a function selection step of selecting a function to be set in the frame; and
    a second command sending step of sending a second command to the image capture apparatus, wherein the second command indicates the function selected in the function selection step.

14. A storage medium according to claim 13, wherein the shape of the frame to be set in the frame setting step is rectangular, circular, polygonal, or one pixel.

15. A storage medium according to claim 13, wherein the method further comprises a display step of displaying the frame on the captured image.

16. A storage medium according to claim 13, wherein the function to be selected in the function selection step includes a focus, an exposure, a white balance, or a digital zoom function.

17. A storage medium according to claim 13, wherein the method further comprises a display step of displaying the frame on the captured image.

18. A storage medium according to claim 17, wherein the method further comprises a color change step of changing a color of a rim of the frame according to the function selected in the function selection step.

* * * * *

UNITED STATES PATENT AND TRADEMARK OFFICE
CERTIFICATE OF CORRECTION

PATENT NO.       : 7,161,619 B1                                         Page 1 of 1
APPLICATION NO.  : 09/361413
DATED            : January 9, 2007
INVENTOR(S)      : Mitsuo Niida et al.

It is certified that error appears in the above-identified patent and that said Letters Patent is hereby corrected as shown below:

<u>COLUMN 1</u>:

Line 57, "appartus" should read --apparatus--.

<u>COLUMN 2</u>:

Line 1, "appratus" should read --apparatus--.

<u>COLUMN 31</u>:

Line 45, "control;" should read --control:--.

Signed and Sealed this

Twenty-seventh Day of May, 2008

JON W. DUDAS
*Director of the United States Patent and Trademark Office*